(12) United States Patent
Brown, Jr.

(10) Patent No.: US 8,882,170 B2
(45) Date of Patent: Nov. 11, 2014

(54) PROTECTIVE VEHICLE ENCLOSURE

(71) Applicant: Arlen F. Brown, Jr., King George, VA (US)

(72) Inventor: Arlen F. Brown, Jr., King George, VA (US)

(*) Notice: Subject to any disclaimer, the term of this patent is extended or adjusted under 35 U.S.C. 154(b) by 0 days.

(21) Appl. No.: 13/788,888

(22) Filed: Mar. 7, 2013

(65) Prior Publication Data

US 2013/0234467 A1    Sep. 12, 2013

Related U.S. Application Data

(60) Provisional application No. 61/607,709, filed on Mar. 7, 2012, provisional application No. 61/772,727, filed on Mar. 5, 2013.

(51) Int. Cl.

| | | |
|---|---|---|
| *B60J 1/00* | (2006.01) | |
| *B62D 31/00* | (2006.01) | |
| *B62D 25/04* | (2006.01) | |
| *B60J 5/04* | (2006.01) | |

(52) U.S. Cl.
CPC ............... *B62D 31/00* (2013.01); *B62D 25/04* (2013.01); *B60J 5/0487* (2013.01)
USPC ......................................................... 296/79

(58) Field of Classification Search
USPC ............................ 296/79, 83, 96.21, 102, 148
See application file for complete search history.

(56) References Cited

U.S. PATENT DOCUMENTS

| | | |
|---|---|---|
| 3,827,019 A | 7/1974 | Serbu |
| 4,013,315 A | 3/1977 | West |
| 4,621,859 A | 11/1986 | Spicher |
| 4,773,694 A | 9/1988 | Gerber |
| 4,932,714 A | 6/1990 | Chance |
| 5,190,340 A | 3/1993 | Nuscher |
| 5,217,275 A | 6/1993 | Ridge |
| 5,259,656 A | 11/1993 | Carroll |
| 5,310,235 A | 5/1994 | Seymour et al. |
| 5,388,881 A | 2/1995 | Spencer et al. |
| 5,393,118 A | 2/1995 | Welborn |
| 5,429,404 A | 7/1995 | King, Sr. |
| 5,788,317 A | 8/1998 | Nation |
| 5,975,615 A | 11/1999 | Showalter |
| 6,007,134 A | 12/1999 | Weston |
| 6,206,447 B1 | 3/2001 | Nation |
| 6,276,745 B1 | 8/2001 | Wilson |
| 6,439,637 B1 | 8/2002 | Tyrer |
| 6,776,445 B1 | 8/2004 | Conner et al. |
| 6,902,220 B2 * | 6/2005 | Moskos et al. .............. 296/79 |
| 6,916,059 B2 | 7/2005 | Feinberg |
| 6,926,334 B1 | 8/2005 | Diehm |
| 2005/0093331 A1 | 5/2005 | Moskos et al. |

OTHER PUBLICATIONS

Seluga et al. "Analysis and prevention of child ejections from golf cars and personal transport vehicles" Seluga Paper 09-0186 [2009].

(Continued)

*Primary Examiner* — Joseph D Pape
*Assistant Examiner* — Dana Ivey
(74) *Attorney, Agent, or Firm* — Millen, White, Zelano & Branigan, P.C.

(57) ABSTRACT

Protective vehicle enclosures and components thereof for opened sided vehicles, such as golf carts, which include a rigid, lightweight frame and flexible weather proof cover. Methods for installing these protective vehicle enclosures use existing mounts on the vehicle.

33 Claims, 19 Drawing Sheets

(56) References Cited

OTHER PUBLICATIONS

Seluga et al. "Low Speed Vehicle Passenger Ejection Restraint Effectiveness," Journal Accident Analysis & Prevention [2005]; 37:4:801-806.

http://www.golfcartpartsdirect.com/ecom-catshow/493.html 2 Pages, [Mar. 7, 2013].
http://www.foreconcepts.com/ 2 Pages, [Mar. 7, 2013].
http://www.powerequipmentsolutions.com/components/com_virtuemart/shop_image/product/Curtis-Club_Car.jpg 1 Page, [Mar. 7, 2013].

* cited by examiner

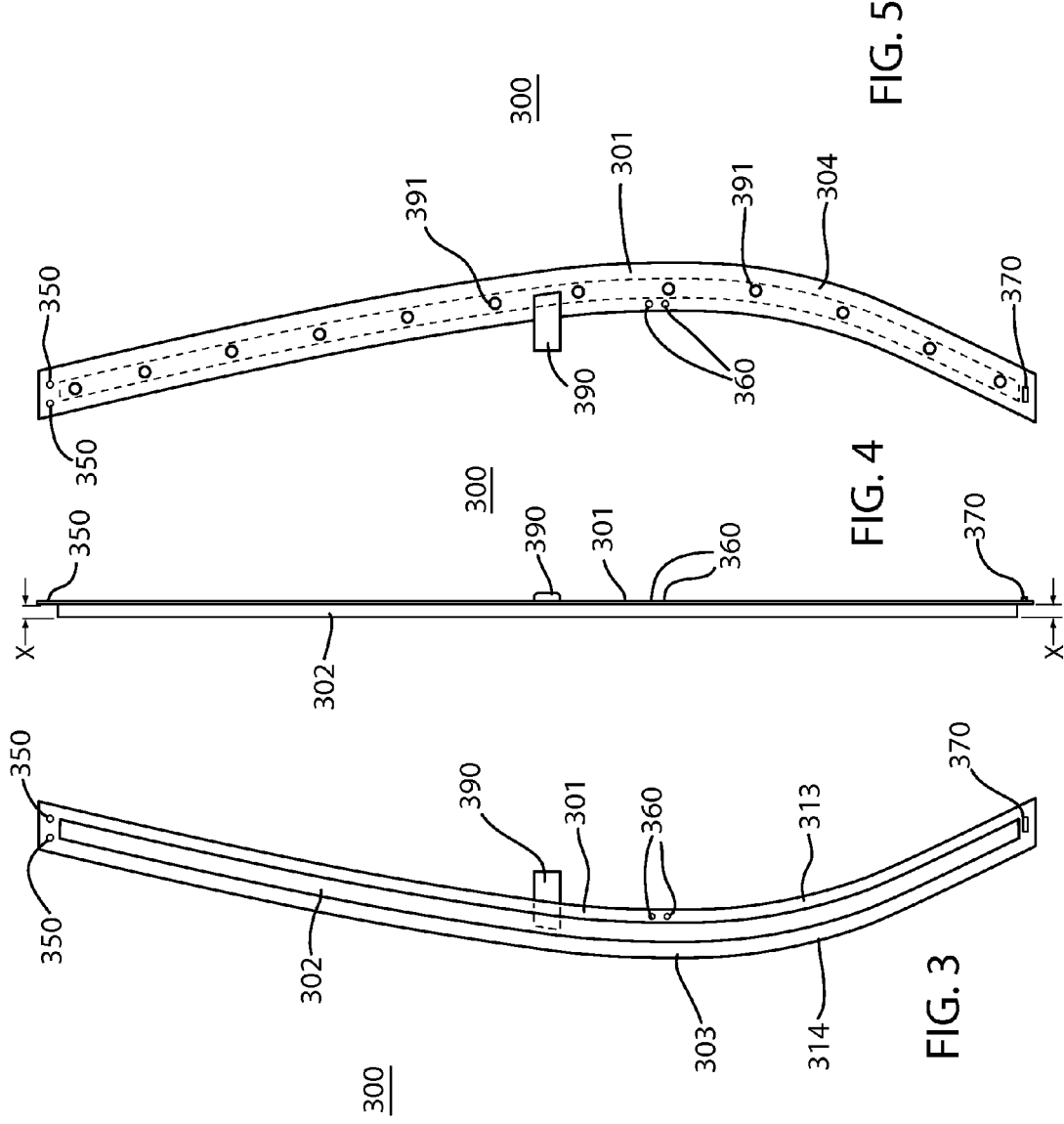

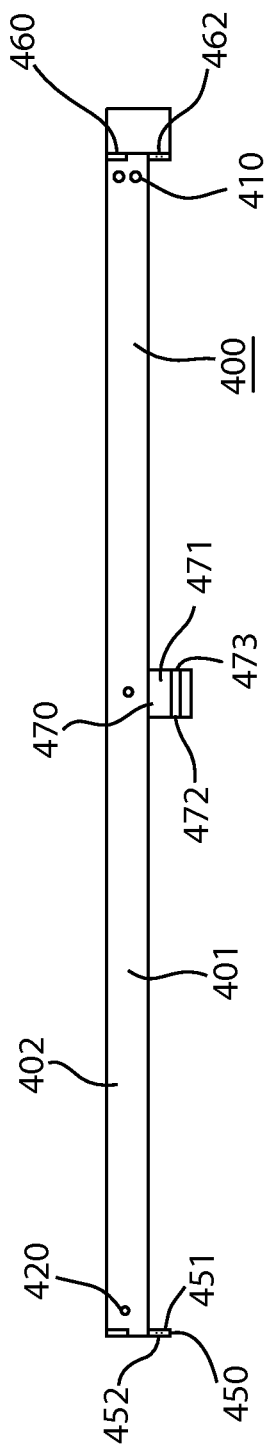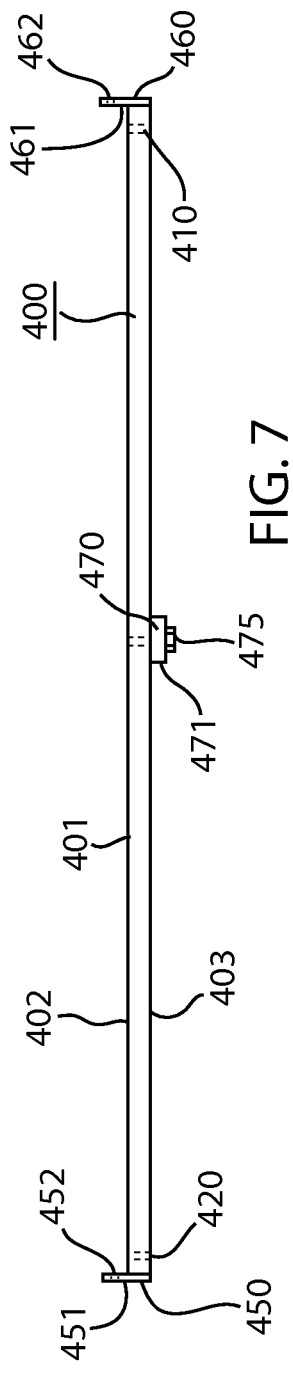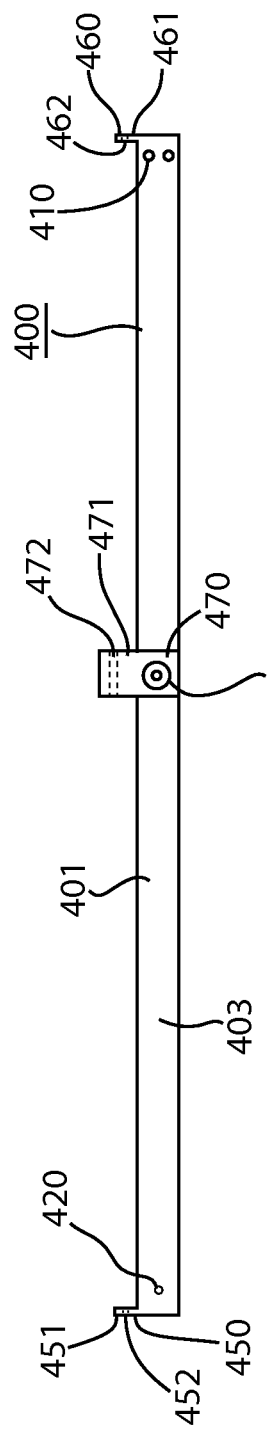

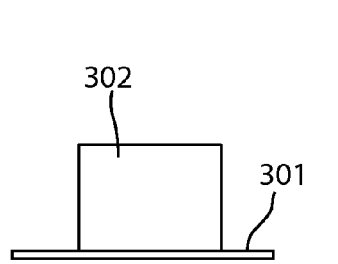
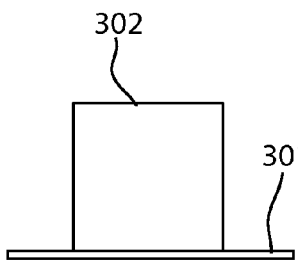
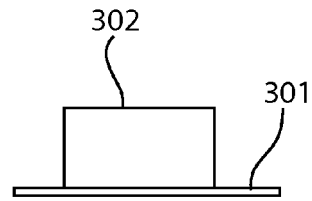
FIG. 23A        FIG. 23B        FIG. 23C
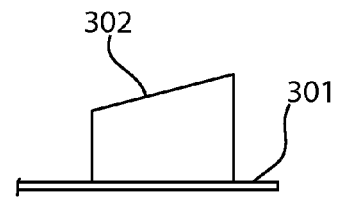
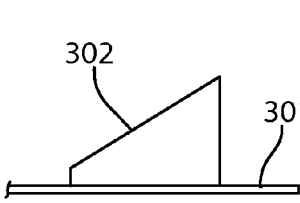
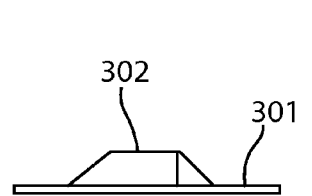
FIG. 23D        FIG. 23E        FIG. 23F
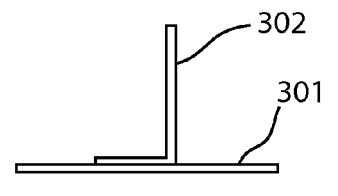
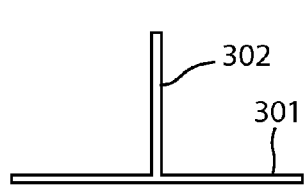
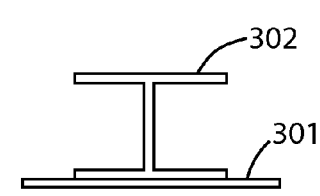
FIG. 23G        FIG. 23H        FIG. 23I

PROTECTIVE VEHICLE ENCLOSURE

RELATED APPLICATIONS

This application claims the benefit of priority to Provisional Application No. 61/607,709, filed on Mar. 7, 2012, and Provisional Application No. 61/772,727, filed Mar. 5, 2013, which are incorporated herein by reference.

FIELD OF THE INVENTION

The invention relates to protective vehicle enclosures and components thereof for opened sided vehicles such as golf carts, personal transport vehicles, tractors, all-terrain vehicles (ATVs), lawn mowers, tractors and light utility vehicles. In particular, the invention relates to protective vehicle enclosures and components thereof that are rigid and light in weight.

The invention also relates to methods for installing protective vehicle enclosures on opened sided vehicles.

BACKGROUND

The following patents and published patent applications provide examples of vehicle enclosures, including golf cart enclosures.

U.S. Pat. No. 3,827,019 issued on Jul. 30, 1974, to Serbu,
U.S. Pat. No. 4,013,315 issued on Mar. 22, 1977, to West,
U.S. Pat. No. 4,621,859 issued on Nov. 11, 1986, to Spicher,
U.S. Pat. No. 4,773,694 issued on Sep. 27, 1988 to Gerber, C. E.,
U.S. Pat. No. 4,932,714 issued on Jun. 12, 1990 to Chance, H.,
U.S. Pat. No. 5,190,340 issued on Mar. 2, 1993 to Nuscher, E. H.,
U.S. Pat. No. 5,217,275 issued on Jun. 8, 1993 to Ridge, W. D.,
U.S. Pat. No. 5,259,656 issued on Nov. 9, 1993 to Carrol,
U.S. Pat. No. 5,310,235 issued on May 10, 1994 to Seymour et al.
U.S. Pat. No. 5,388,881 issued on Feb. 14, 1995, to Spencer,
U.S. Pat. No. 5,393,118 issued on Feb. 28, 1995 to Welborn, R. B.
U.S. Pat. No. 5,429,404 issued on Jul. 4, 1995, to King,
U.S. Pat. No. 5,788,317 issued on Aug. 4, 1998 to Nation, R.,
U.S. Pat. No. 5,975,615 issued on Nov. 2, 1999 to Showalter, J. M.,
U.S. Pat. No. 6,007,134 issued on Dec. 28, 1999 to Weston, A. G.,
U.S. Pat. No. 6,206,447 issued on Mar. 27, 2001 to Nation, R. F.,
U.S. Pat. No. 6,276,745 issued on Aug. 21, 2001 to Wilson,
U.S. Pat. No. 6,439,637 issued on Aug. 27, 2002 to Tyler,
U.S. Pat. No. 6,776,445 issued on Aug. 17, 2004 to Conner et al.,
U.S. Pat. No. 6,916,059 issued on Jul. 12, 2005 to Feinberg,
U.S. Pat. No. 6,926,334 issued on Aug. 9, 2005 to Diehm,
U.S. Patent Pub. No.: US 2005/0093331, published on May 5, 2005, by Al, Moskos et al.

Many of the enclosures described in the above patents suffer in that they employ heavy frames which are expensive and difficult to install. Many of the lightweight enclosures described in the above patents suffer in that they employ doors with zipper closures that must be unzipped to allow a user to enter or exit the cart. Many of the enclosures described in the above patents also suffer in that they encumber the users of the vehicle by providing doors that partially block the ingress and egress of a user to and from the vehicle.

In providing a protective vehicle enclosure for an open sided vehicle, it is desirable to provide a strong rigid frame to firmly support a flexible waterproof cover to protect against the weather while remaining light in weight so as not to become too top heavy and disrupt the stability of the vehicle against tipping. The American National Standards Institute (ANSI) sets safety standards for golf carts. Tests for vehicle stability against tipping both laterally and longitudinally are set forth in ANSI/NGCMA Z135-2004. These tests are performed with a vehicle payload of no less than 170 lb. or more than 180 lb. With such a payload equal to the weight of about one passenger, adding significant weight when installing of a weather-protective enclosure on a golf cart may render its performance in these stability tests uncertain.

In providing a protective vehicle enclosure for an open sided vehicle, it is also desirable to provide easy access into and out of the vehicle without encumbering the users of the vehicle.

Seluga et al. conclude in their article "Low Speed Vehicle Passenger Ejection Restraint Effectiveness," Journal Accident Analysis & Prevention 2005; 37:4:801-806, that hip or handhold restraint systems typically found on existing golf carts can be ineffective, particularly where the passenger is a child. Accordingly, it would be desirable to provide a protective vehicle enclosure for an open sided vehicle which enhances passive restraint of the occupants within the vehicle.

SUMMARY OF THE INVENTION

One object of this invention is to provide a protective enclosure for open sided vehicles that keeps the occupants, seats, and equipment warm and dry during inclement weather and is lightweight.

Another object of this invention is to provide a protective enclosure for open sided vehicles that protects against the weather and provides easy access in and out of the vehicle.

Another object of this invention is to provide a protective enclosure for open sided vehicles that protects against the weather and attaches to existing mounts already present in a variety of different vehicles.

Another object of this invention is to provide a protective enclosure for open sided vehicles that enhances passive restraint of occupants sitting in a seat of the vehicle.

Another object of this invention is to provide a protective enclosure for open sided vehicles that enhances the support of a roof on the vehicle.

Another object of this invention is to provide a protective enclosure for open sided vehicles which is easy to install.

Another object of this invention is to provide a protective enclosure for open sided vehicles with a soft cover that is taut so as to have the appearance of a small hard sided automobile and improve visibility through transparent portions.

Another object of this invention is to provide a frame for a protective enclosure for open sided vehicles that is rigid, strong and lightweight.

Another object of this invention is to provide specialized components of a frame for a protective enclosure for open sided vehicles designed to reduce weight and enhance rigidity.

Another object of this invention is to provide a brace for open sided vehicles that enhances passive restraint of occupants sitting in a seat of the vehicle and enhances the support of roof on the vehicle.

Another object of this invention is to provide a method for installing a frame for a protective enclosure on an open sided vehicle.

These objects are achieved through the protective vehicle enclosure and components thereof provided by the present invention.

BRIEF DESCRIPTION OF THE DRAWINGS

FIG. 3 is a front elevation view of a front door jamb of the present invention.

FIG. 4 is a side elevation view of a front door jamb of FIG. 3.

FIG. 5 is a rear elevation view of a front door jamb of FIG. 3.

FIG. 6 is a front elevation view of a rear door jamb of the present invention.

FIG. 7 is a side elevation view of a rear door jamb of FIG. 6.

FIG. 8 is a rear elevation view of a rear door jamb of FIG. 6.

FIGS. 23A-23I are cutaway cross-sectional views of various front door jambs of the present invention.

Figure 1:
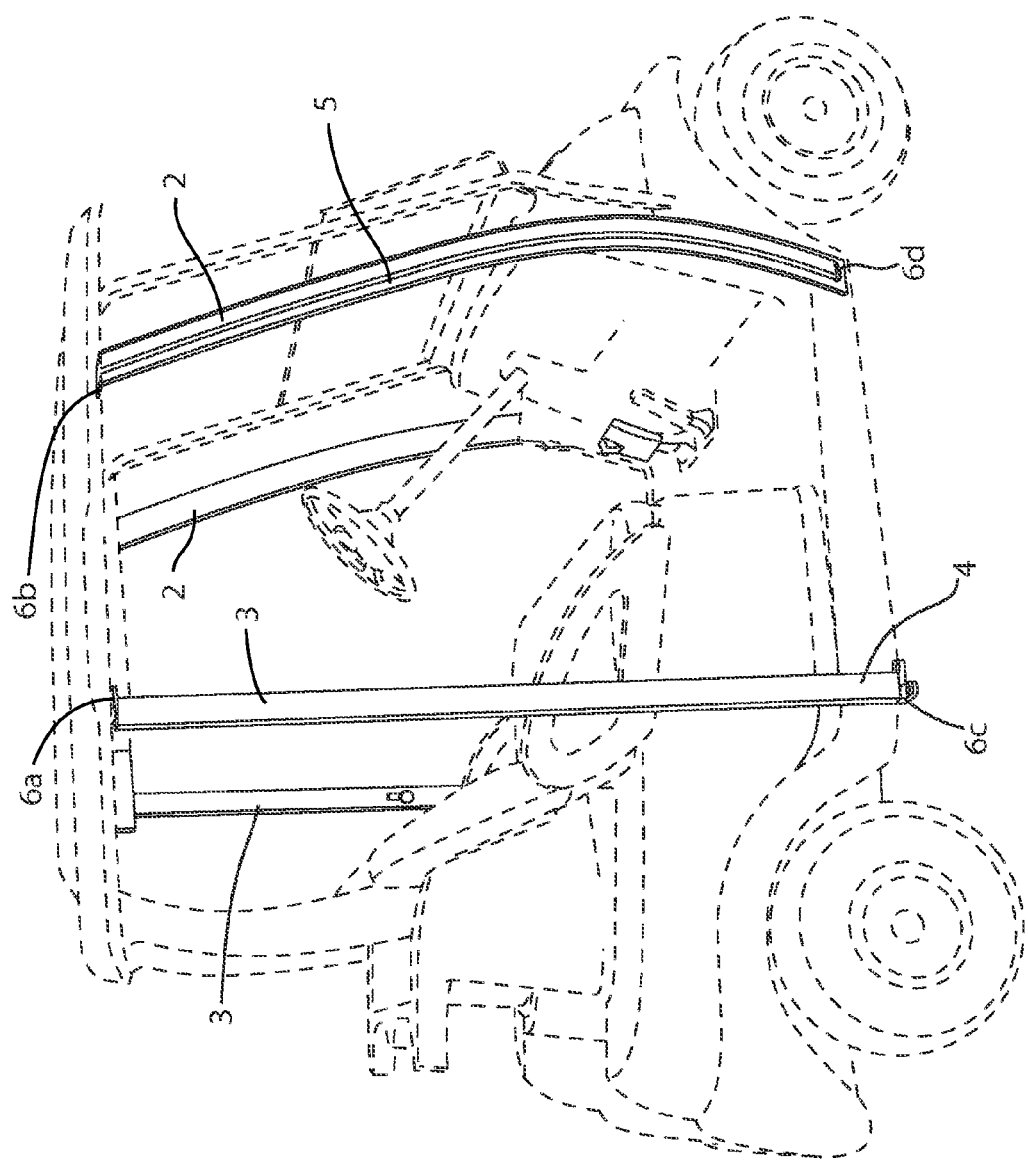
FIG. 1 is a front elevation view of a rear door jamb and a front door jamb, as frame components of this invention, installed on a golf cart.

There is provided by the present invention a protective vehicle enclosure which is rigid but light in weight and preferably weather-resistant. The protective vehicle enclosure preferably weighs less than 75 lbs., more preferably less than 50 lbs. It is contemplated that preferred embodiments of the protective vehicle enclosure of this invention can weigh from about 17-50 pounds, including 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 pounds.

The protective vehicle enclosure of this invention is well adapted for use on open sided vehicles having a roof. Certain embodiments are well adapted to vehicles also having a windshield and a fender supporting the windshield. Other embodiments are well adapted to a vehicle having a roof and a seat for occupants. Preferred embodiments are adapted to a vehicle having a roof, windshield, and a fender for supporting said windshield and a seat for occupants. These vehicles include golf carts, personal transport vehicles, tractors, all-terrain vehicles (ATVs), lawn mowers, light utility vehicles, and low speed street legal passenger vehicles with a maximum speed of less than 35 MPH. The preferred vehicle protective enclosures of this invention are particularly suitable for use on mass produced golf carts such as those produced by for example, Club Car and Yamaha.

A rigid, lightweight enclosure frame is used in the protective vehicle enclosure of this invention. This lightweight enclosure frame 1, shown in FIG. 1, can comprise just four structural supports: two front door jambs 2 and two rear door jambs 3, to support a flexible water repellant cover, as shown in FIG. 2, and optionally a hinged vehicle door 20*b*. These four structural supports preferably total less than 30 lbs. in weight, and more preferably less than 20 lbs. in weight. These four structural supports can comprise any conventional structural material including wood, plastics such as PVC, polyesters and nylons; metals such as steel, aluminum, titanium and their alloys; fiber reinforced plastics such as those with fiberglass, Kevlar® or carbon fiber and composites such as wood/plastic composites.

In preferred embodiments, these door jambs can be individually removed and replaced in the event of damage. The front and rear door jambs are each designed to be light in weight and rigid, with the rear door jamb being more rigid and strong than the front door jamb to support a hinged door thereon.

In preferred embodiments, the front door jamb is curved to allow for easy entry and exit as it offers more space. In preferred embodiments, the rear door jambs are sufficiently rigid so as to deflect less than two inches under a center load of 50 pounds over a four foot span along their length. In some preferred embodiments, the enclosure frame also provides passive restraint of an occupant sitting in the seat of said vehicle through the rigidity and placement of the rear door jamb. Specifically, the rear door jamb is preferably positioned on the vehicle to substantially align with an occupant's body when properly seated in the vehicle.

Furthermore, in some preferred embodiments, the enclosure frame also provides additional support for the roof of the vehicle through the rigidity and placement of the rear door jamb. The rear door jamb may comprise a hollow rectangular tubular metal member which is at least 1.5 inches in width and at least 0.5 inches thick for these preferred embodiments. It is contemplated the width of the rectangular aluminum tubular member can have a preferred width of about 1.5 to about 8.0 inches, including 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4 6.5, 6.6, 6.7, 6.8, 6.9, 7.0, 7.1, 7.2, 7.3, 7.4, 7.5, 7.6, 7.7, 7.8, 7.9 or 8.0 inches and a preferred thickness of about 0.1 to about 2.0 inches, including 0.1, 0.2, 0.3, 0.4 0.5, 0.6, 0.7, 0.8, 0.9, 1.0, 1.1, 1.2, 1.3, 1.4, 1.5, 1.6, 1.7, 1.8, 1.9 or 2.0 inches.

The wall thickness of the hollow rectangular tubular metal member is preferably greater than $\frac{1}{16}$ inch (0.0625 inches). It is contemplated the rectangular aluminum tubular member can have a preferred wall thickness of about 0.0625 to about 0.256 inches, including 0.0625, 0.0667, 0.0688, 0.0714, 0.0787, 0.0769, 0.0833, 0.0885, 0.0909, 0.0984, 0.10, 0.1083, 0.111, 0.118, 0.125, 0.1279, 0.1378, 0.143, 0.148, 0.157, 0.166, 0.167, 0.187, 0.1978, 0.20, 0.207, 0.217, 0.226, 0.236, 0.246, 0.25 or 0.256 inches.

Figure 2:
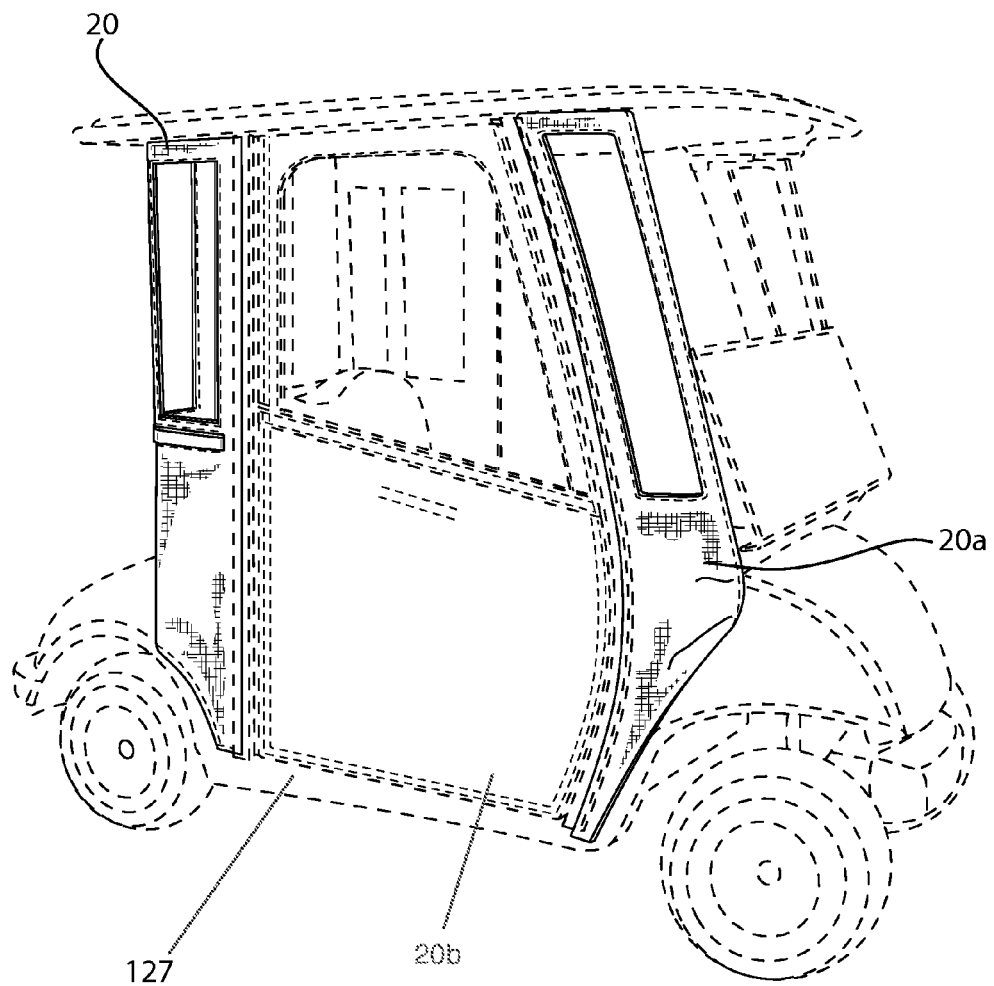
FIG. 2 is a front elevation view of the frame components of FIG. 1 supporting a flexible water repellant cover.

To support portions of a flexible water repellant cover 20 and 20a, as shown in FIG. 2, each of the door jambs has surfaces 4 and 5, shown in FIG. 1, on which to mount fasteners for flexible water-repellant cover portions 20 and 20a. Each door jamb also comprises mounts 6a, 6b, 6c and 6d for mounting directly or indirectly to the floor or a floor area (lower portion) and the roof or a roof area of the vehicle. In preferred embodiments, the front door jambs are adapted to be mounted at a location less than one foot behind the windshield and front fenders and the rear door jambs are adapted to be mounted adjacent the seat for occupants. To aid in the placement of the door jambs, adapters or brackets can be used which enable the door jambs to be mounted to existing mounts in the vehicle such as mounts for the windshield to the fender, mounts for trim on the dash board, mounts for the roof to pre-existing support members, mounts for hand holds in the roof and mounts for a seat to the vehicle chassis. The use of existing mounts simplifies the assembly, replacement and removal of the enclosure frame without compromising the structural integrity of the vehicle and also limits added weight. It is contemplated that preferred embodiments of the four structural supports with adapters provided by this invention can weigh from about 7 lbs. to about 20 lbs., including 20, 19, 18, 17, 16, 15, 14, 13, 12 11, 10, 9, 8 or 7 lbs.

Figure 10:
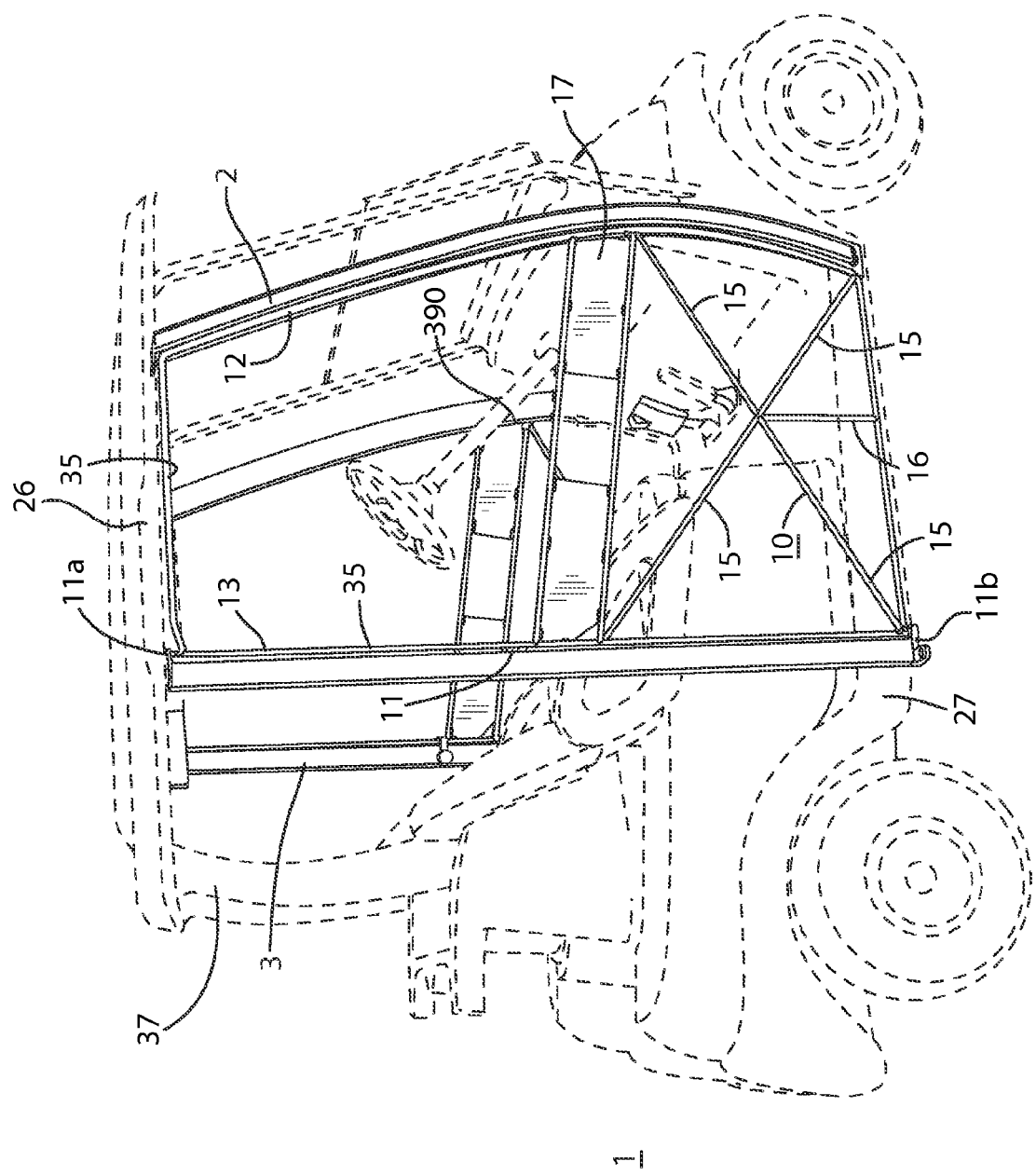
FIG. 10 is a front elevation view of a rear door jamb, a front door jamb, and a door frame, as frame components of this invention, installed on a golf cart.

The enclosure frame 1 preferably includes a pair of lightweight door frames 10, as shown in FIG. 10, each hingedly supported by one of the pair of rear door jambs 3, preferably by easily removable hinge pins 11, 11a and 11b, as shown in FIG. 10. Each door frame 10, when in a closed position, is also supported by the front door jamb 2. Each door frame opens rearward and is preferably curved along its front edge 12 for easy entry and exit. Preferably, each door frame 10 comprises a frame 35 made of metal, fiber reinforced plastic, such as carbon fiber, metal reinforced plastic or a combination thereof that defines its periphery and conforms to the shape of the front door jamb 2, the rear door jamb 3, the roof of the vehicle 26 and the floor of the vehicle 127. It is contemplated that the door frame 10 can comprise a tubular frame of metal, fiber reinforced plastic, metal reinforced plastic or a combination thereof. Where the door frame 10 is made of moldable plastic, such as by blow molding, the frame may be integrated into a solid door as a monolithic structure. Each door frame preferably weighs less than 10 lbs., more preferably, less than 5 lbs., with some embodiments weighing from about 1 lbs. to about 5 lbs., including 5 lbs, 4 lbs, 3 lbs, 2 lbs. or about 1 lb. where moldable plastics or light weight metals are used.

Figure 11:
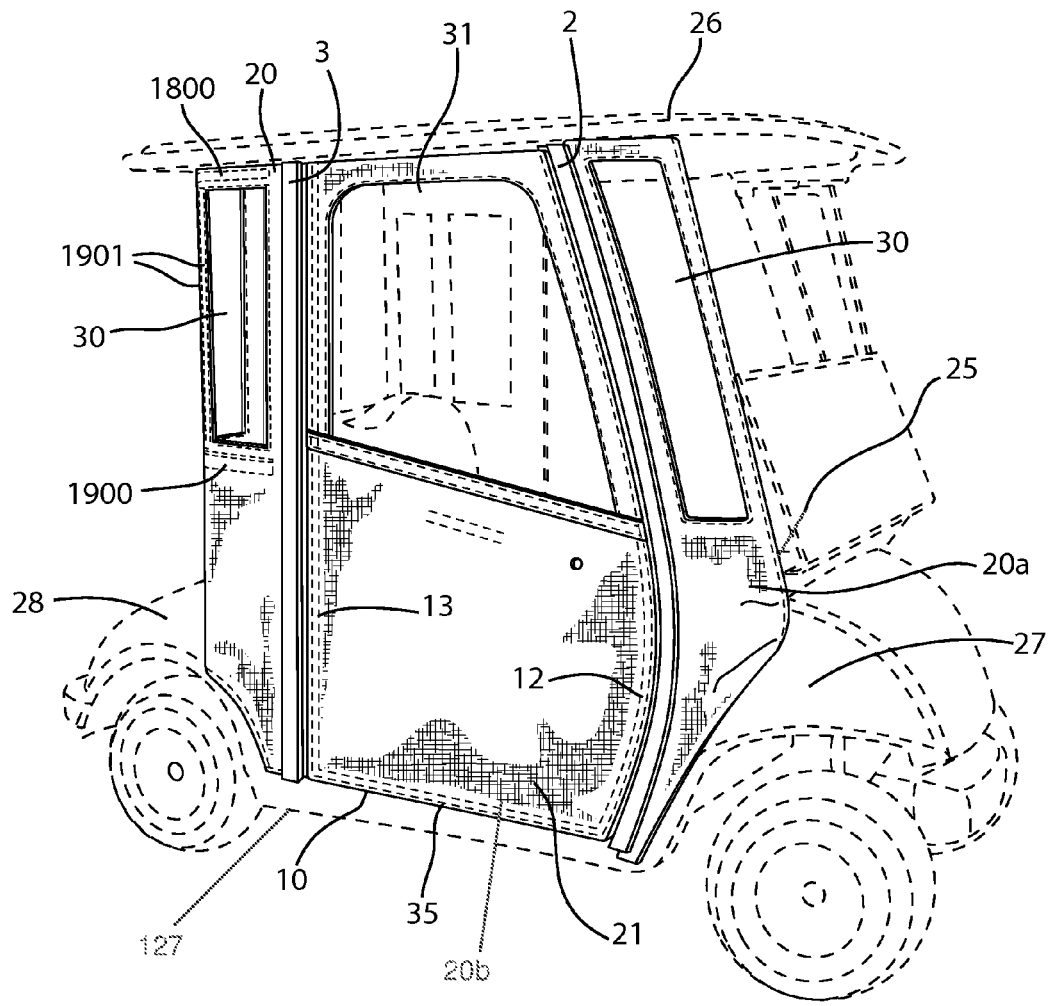
FIG. 11 is a front elevation view of the frame components of FIG. 9 supporting a flexible water repellant cover.

In preferred embodiments, the door frame 10 is adapted to support a flexible water repellant cover 21, as shown in FIG. 11. Preferably, the front edge 12 of the door frame is curved to be supported by a curved front door jamb 2 when installed and the rear edge 13 of the door frame is substantially straight.

Optionally, the door frame includes cross members 15, shown in FIG. 10, from the front edge 12 to the rear edge 13 of the door frame 10 and optionally support members 16 that extend from cross members 15. The door frame may optionally include one component 17 of a two component closure pair positioned on the front edge 12 of the door frame 10 that interacts with a corresponding component 390 positioned on the front door jamb 2. Suitable two component closure pairs include, for example: a magnetic fastener comprising at least one magnet and a striker attracted to a magnetic field, a hook and loop fastener, a hook and latch fastener, a button and hole fastener, a snap fastener (male/female), a zipper fastener (left and right sides), a bolt and latch fastener, a bolt and striker (hole) fastener, a draw hasp and striker fastener or a combination thereof. Other closure pairs known to those skilled in the art are also contemplated by the invention.

The two component closure pair keeps the door frame in a closed position, as illustrated in FIG. 11. In some embodiments, a closure pair of a magnet and striker is preferred to allow relative motion the door and front door jamb without a rattling noise. In some embodiments it is desirable for the closure pair to exhibit a high closing strength such that the door frame will provide passive restraint of an occupant sitting in a seat of the vehicle once the closure pair on the door frame and front door jamb is engaged.

The protective vehicle enclosure of this invention includes, in addition to the enclosure frame, a flexible water repellant cover, as shown in FIGS. 2 and 11 as portions 20, 20a and 21. The flexible water repellant cover extends over the enclosure frame enclosing the sides of the open sided vehicle and preferably provides a barrier to the outside environment.

This flexible water repellant cover can comprise conventional materials for such purpose such as clear plastic, acrylics (PLEXIGLASS®), polycarbonate, vinyl, canvas, polyethylene, polypropylene, GORE-TEX®, natural rubber, SUNBRELLA® type fabrics, latex, synthetic polymer fabrics such as fluoro-polymer fabrics, nylon fabric, polyethylene fabric, polyester fabric, polyurethane fabrics and fabrics coated with synthetic polymers such as PVC, silicone resins, polyurethanes and polyethylene. Preferably, the flexible water repellant cover includes transparent portions, which can comprise conventional soft transparent plastics such as PVC and cellulose acetate, or rigid transparent plastics such as acrylics (PLEXIGLASS®), polyesters, PVC, polyethylene, polypropylene and polycarbonates.

As shown in FIGS. 2 and 11, the flexible water repellant cover, to completely enclose the occupant seating area from the windshield to the rear of the cart, preferably comprises separate sections which include a pair of front sections 20a, a pair of door sections 21 and a rear section 20 that can comprise one or more pieces. The sections are preferably removable and can be stored in the vehicle. The front sections 20a extend from the front door jamb 2 to the windshield frame 25 and from the roof 26 of the vehicle to a fender 27. Sections 20, 20a and 21 have fasteners at their periphery (not shown) to secure the flexible water repellant cover to enclosure frame 1 or door frame 10, which include Velcro® fasteners, glue, bolts, screws, pins, rivets, snaps, zippers, tabs or a combination thereof. Preferably, the door sections 21 wrap around the frame 35 that forms the outer periphery of the door frame. Each fastener preferably comprises Velcro® fasteners that extend along the edges of the flexible water repellant cover sections. Each of sections 20 and 20a preferably has a transparent section 30. The door sections 21 also preferably have a transparent section 31. The transparent section preferably includes a zipper or the like along the top and side edges to allow the transparent section to be opened thus allowing outside air into the occupant seating area. The rear section 20 may comprise two pieces, each of which extend from one rear door jamb 3 to one of a pair of existing roof supports 37 on the vehicle, shown in FIG. 10 or support frames 1800 mounted to the roof 26. Where the vehicle is also open in the back as well as the sides, the rear section 20 can comprise one piece that extends from one rear door jamb 3 to the other rear door jamb 3. Alternatively, a third piece can extend between the pair of existing roof supports 37 on the vehicle or a pair of support frames 1800 mounted to the roof at the mounts for roof supports 37. The rear section also preferably extends from the roof 26 of the vehicle to the rear fenders 28 of the vehicle. The rear section preferably has one or more transparent sections 30 and more preferably a transparent section which opens to provide a back window, preferably with a zipper or the like similar to the transparent sections of the door, particularly where the rear section extends around the back of the vehicle. Where the rear section comprises more than one piece, they can be connected to each other by conventional means such as Velcro® fasteners, buttons, hooks, zippers, snaps and the like.

Figure 18A:
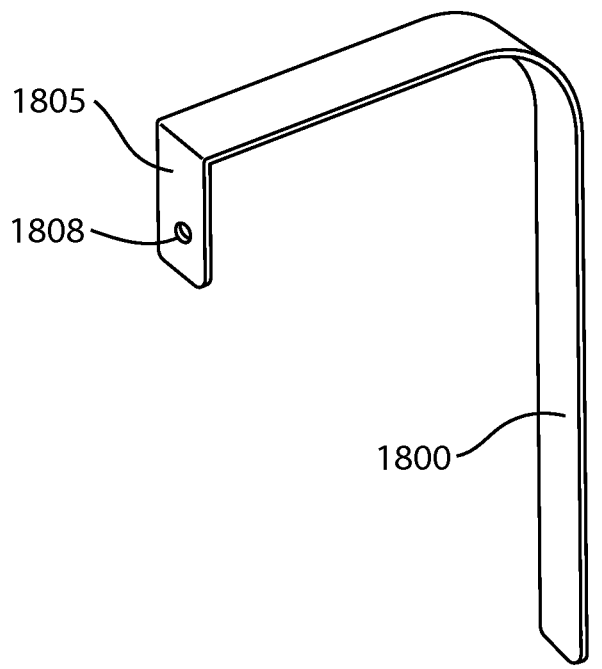
FIGS. 18A, 18B and 18C are support frames for the rear panel of a flexible water repellant cover used in some embodiments of the protective vehicle enclosure of this invention.
Figure 18B:
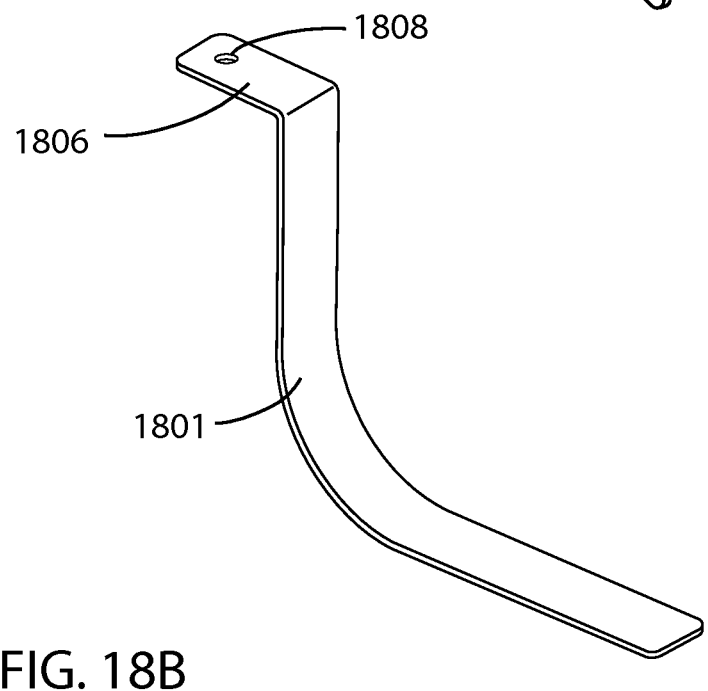
Figure 18C:
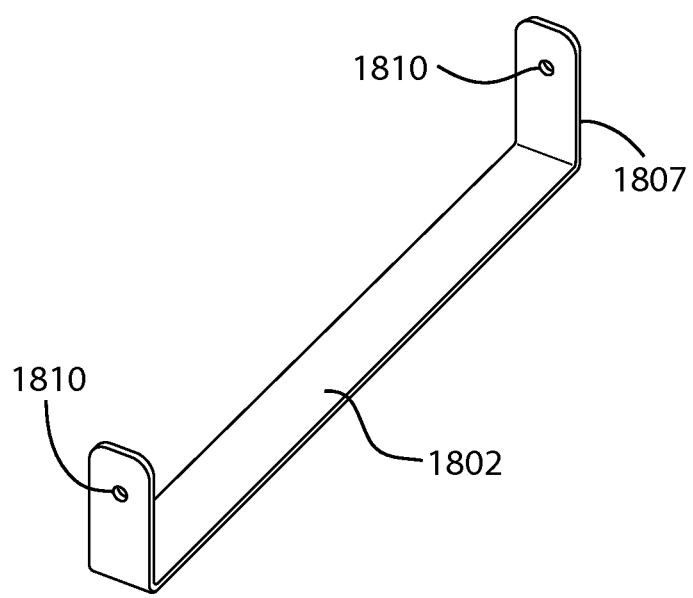
Figure 19A:
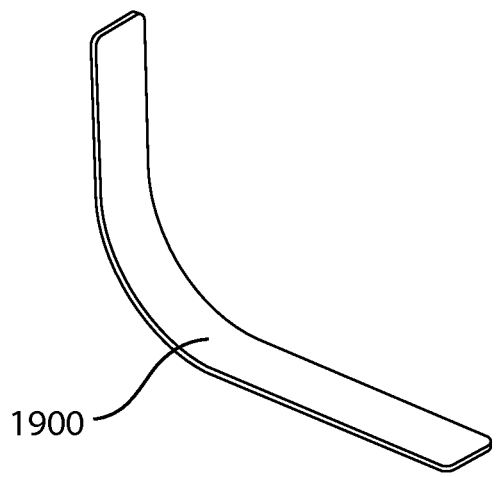
FIGS. 19A and 19B are support bars that are inserted in pockets of the rear panel of a flexible water repellant cover used in some embodiments of the protective vehicle enclosure of this invention.
Figure 19B:
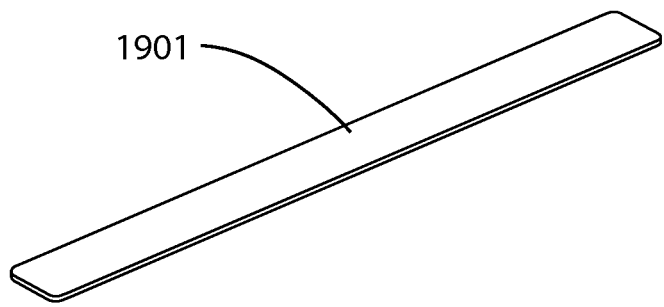

The rear section 20 preferably has support frames 1800 and support bars 1900 inserted therein that define a desired shape around the rear end of the occupant seating area. The support bars and frames can be made of plastic, wood, metal or similar material that enhances the rigidity of the flexible water repellant cover. Preferably, these support bars and frames slide into pockets sewn into the back of the panels of the rear section and are removable. FIGS. 18A and 18B illustrate support frames 1800, 1801 and 1802, respectively. Support frames 1800, 1801 and 1802 have mounts 1805, 1806 and 1807, respectively, with holes 1808, 1809 and 1810, respectively, for mounting to the vehicle, preferably to existing roof mounts or the existing frame of the vehicle or to adapters or brackets which connect to existing mounts. FIGS. 19A and 19B illustrate optional support bars 1900 and 1901, respectively, which are adapted to slide into pockets sewn into the back of the panels of the rear section without attachment to the vehicle, as shown in FIG. 11. The bars 1900 and 1901 assist to keep the rear section neat in appearance and form a rear corner for the enclosure.

The present invention also provides a method for installing protective vehicle enclosures on opened sided vehicles having a roof. The method comprises:

A. Installing a frame for a flexible water-proof cover. This installation comprises:

a) mounting two primary frame adapters for a front door jamb at existing mounts in the roof for front supports, b) mounting two secondary frame adapters for a rear door jamb at existing mounts in the roof for hand holds, c) mounting two tertiary frame adapters for the front door jamb at existing mounts for the base of the windshield, d) mounting two front door jambs to the primary frame adapters, the tertiary frame adapters, and a lower portion of the vehicle such as, for example, the floor of the vehicle, e) mounting two rear door jambs to the secondary frame adapters and a lower portion of the vehicle such as, for example, the floor of the vehicle or lower sill, and f) hingedly mounting two doors to the rear door jambs by completing two pin and barrel hinges on each rear door jamb and installing a friction hinge on the rear door jamb for each door, and B. Mounting a flexible water-proof cover to said frame, wherein the frame comprises one or more pieces and these pieces extend from the roof of the vehicle to the floor and from one side of the windshield for said vehicle to the other side of the windshield for said vehicle.

There are provided by the present invention preferred components of an enclosure frame for an open sided vehicle such as a preferred front door jamb, a preferred rear door jamb and a preferred door frame.

A preferred front door jamb of this invention is suited for an open sided vehicle, preferably a golf cart, having a roof, a windshield frame and at least one front fender to support said windshield frame, and is illustrated in FIGS. 3-5. The front door jamb 300 in FIGS. 3-5 is adapted to provide support for a vehicle door 20b (shown in FIG. 2. not shown in FIGS. 3-5) when in a closed position. The front door jamb 300 is made up of a base 301 and a spine 302. Base 301 and spine 302 have a shape that conforms to the shape of the front edge of the vehicle door 20b. Base 301 and spine 302 are shown convexly curved in FIGS. 3-5. to provide more clearance at the lower half as compared to the upper half. This curved shape enhances ingress into and egress from the open sided vehicle and is preferred. In some embodiments of the invention, the lower portion of the base and spine conform to the shape of the front fender of the vehicle so as not to restrict ingress into or egress from the vehicle in any way.

Top surface 303 of base 301 supports the front edge of a vehicle door when in a closed position at portion 313. Spine 302 is positioned on top surface 303 and covers only a portion of top surface 303, leaving uncovered a portion 313 and portion 314. Portion 314 supports fasteners, such as a Velcro® fastener, for a flexible waterproof cover.

Spine 302 is also positioned to abut the front edge of a vehicle door when in a closed position, as shown in FIG. 10. Spine 302 extends above top surface 303 of the base, at a height "X" which is greater than 50% of the thickness of the vehicle door so as to preferably impede air from coming between the base and the vehicle door when the vehicle is in forward motion. Preferably, spine 302 extends above top surface 303 of the base at a height greater than 100% of the thickness the vehicle door and more preferably ranges from 100% to 250% of the thickness of the vehicle door. The height of spine 302 preferably is about 0.5 inches to about 2.0 inches, including 0.5, 0.6, 0.7, 0.8, 0.9, 1.0, 1.1, 1.2, 1.3, 1.4, 1.5, 1.6, 1.7, 1.8, 1.9 or 2.0 inches.

Spine 302 has a rectangular cross section in FIGS. 3-5, but its shape can vary widely. Examples of various spines are shown in the cutaway cross-sectional views of front door jambs of the present invention of FIGS. 23A-23I.

In a preferred embodiment, the front door jamb 300 includes three mounts for anchoring the open sided vehicle to provide rigidity and strength in supporting a vehicle door and a flexible water-proof cover. An upper mount 350 is provided on the base for removably mounting the front door jamb 300 to the roof and/or roof supports of said vehicle either directly or indirectly through use of an adapter. A lower mount 370 is provided on the base for removably mounting the front door jamb 300 to a lower section of said vehicle, including the floor of said vehicle and lower sill, either directly or indirectly through use of an adapter. An intermediate mount 360 is provided on the base for removably mounting the front door jamb to a front fender, body trim mount, dashboard trim mount or windshield frame of said vehicle. Preferably, the intermediate mount uses an existing bolt fastener on the vehicle fender and/or dash board trim and/or cowling.

The upper mount, lower mount and intermediate mount can be any conventional mount, including: one or more holes for receiving bolts, screws, pins, rivets and tabs, one or more slots for receiving bolts, screws, pins, rivets and tabs, one or more bolts to engage holes or slots, one or more screws to engage holes or slots, one or more pins to engage holes or slots, one or more anchors to engage holes and slots, one or more rivets to engage holes or slots, one or more tabs to engage holes or slots, one or more welds to an adapter with one or more holes, slots, bolts, screws, anchors, pins or tabs, or a combination thereof.

Where an adapter is used for the upper mount, the adapter preferably extends from the upper mount of the front door jamb to an existing mount for a roof support. Examples of such an adapters are shown in FIG. 12 and FIGS. 13A and 13B.

Figure 12:
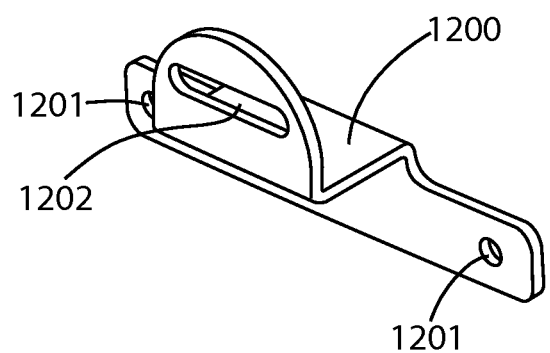
FIG. 12 are perspective views of an adapter for the top mounts of a front door jamb of the present invention.

FIG. 12 illustrates adapter 1200 having holes 1201 for mounting to a an existing mount for a roof support and slotted hole 1202 for mounting to the upper mount of a front door jamb. The slotted hole allows the adapter to be mounted to various vehicles having slightly different mounting arrangements.

Figure 13:
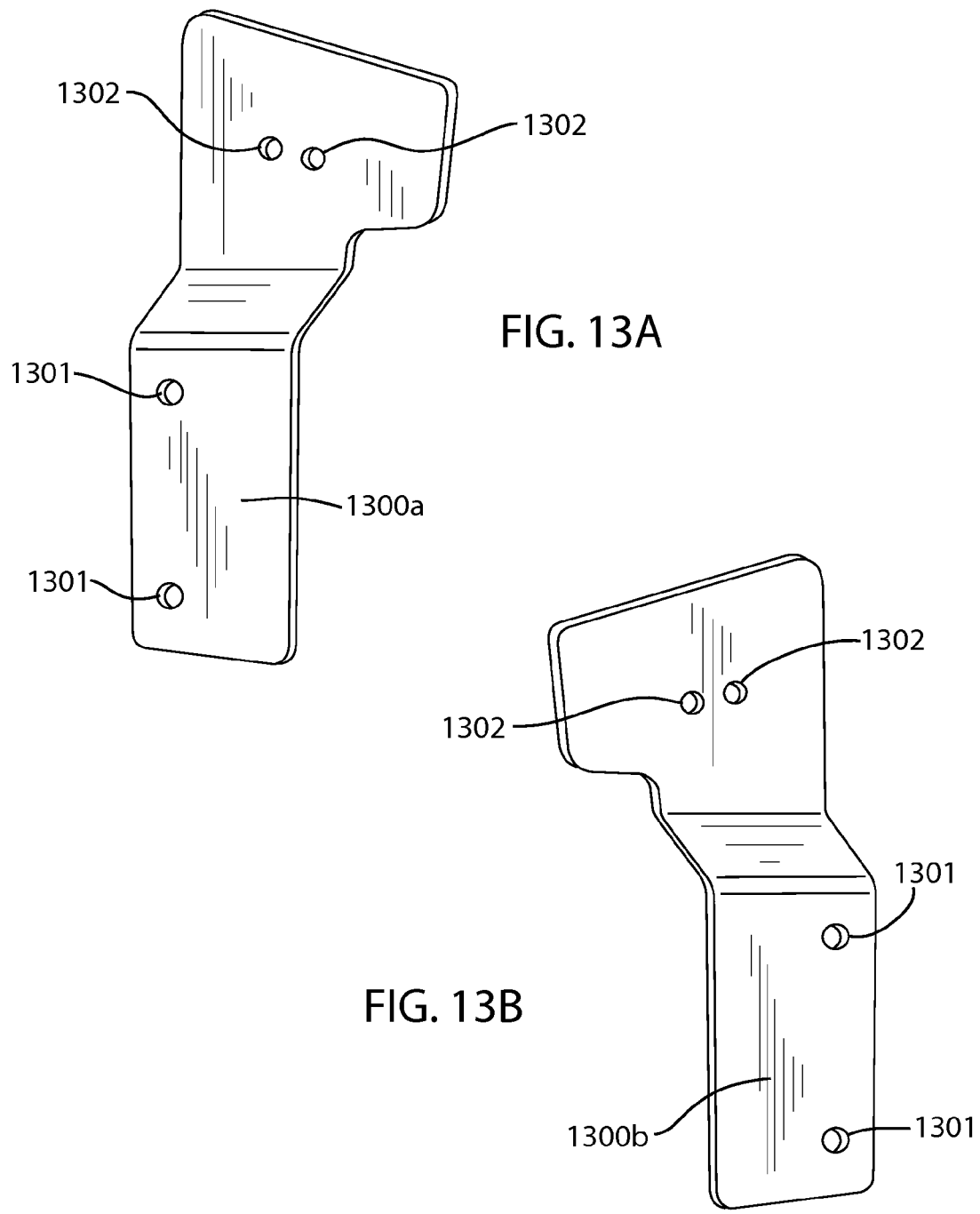
FIGS. 13A and 13B are perspective views of other left and right adapters for the top mounts of a front door jamb of the present invention.

FIGS. 13A and 13B illustrate left adapter 1300a and right adapter 1300b, respectively, each having holes 1301 for mounting to an existing mount for a roof support and holes 1302 for mounting to the upper mount of a front door jamb.

Where an adapter is used for the lower mount, the adapter preferably extends from the lower mount of the front door jamb to a chassis frame member of said vehicle. In some preferred embodiments, an adapter for the floor mount is not needed.

Where an adapter is used for the intermediate mount, the adapter preferably extends from the intermediate mount of the front door jamb to an existing mount of a windshield frame. Examples of such adapters are shown in FIG. 14 and FIGS. 15A and 15B.

Figure 14:
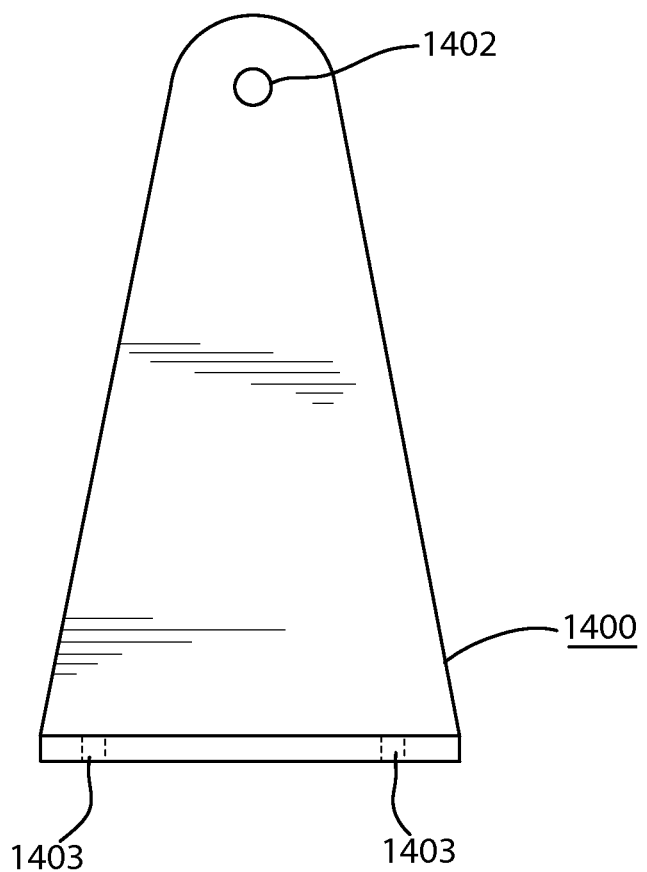
FIG. 14 is a perspective view of and adapter for the mid-mounts of a front door jamb of the present invention.

FIG. 14 illustrates adapter 1400 with hole 1402 for mounting to an existing mount for dashboard trim and 1403 for mounting to the intermediate mount of a front door jamb.

Figure 15A:
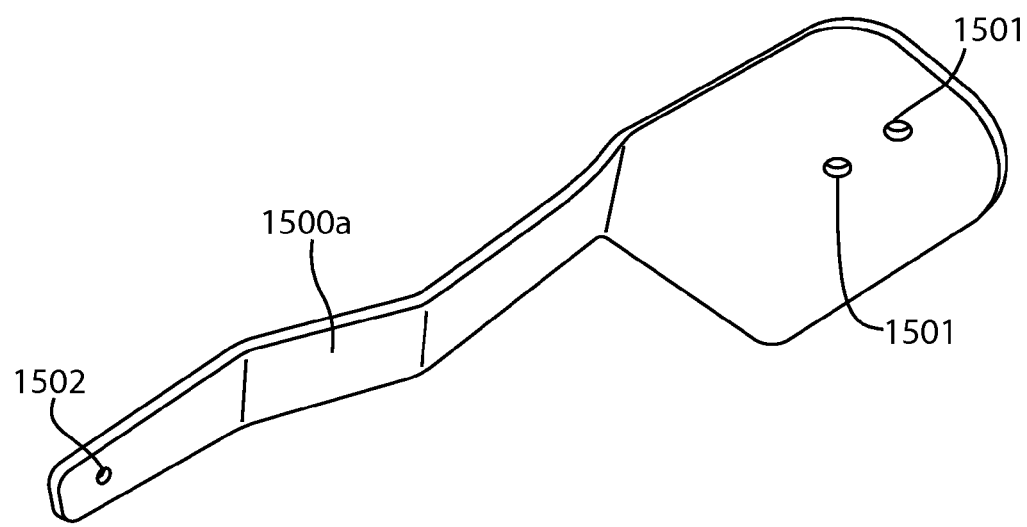
FIGS. 15A and 15B are alternative left and right adapters for the mid mounts of a front door jamb of the present invention.
Figure 15B:
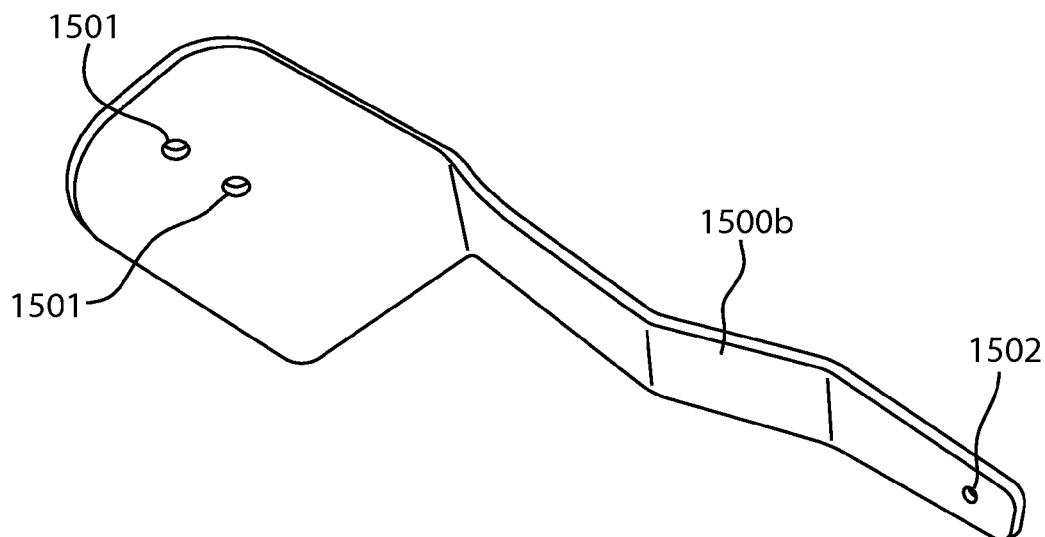

FIGS. 15A and 15B illustrate left adapter 1500a and right adapter 1500b, respectively, each having hole 1502 for mounting to an existing mount of dashboard trim and holes 1501 for mounting to the intermediate mount of a front door jamb.

In certain embodiments, the front door jamb comprises one component of a two component closure pair, as previously discussed, that preferably corresponds with a component of a closure pair on the vehicle door. This provides positive closure when the vehicle door rests on top surface 303 and portion 313.

The two component closure pair can be any conventional closure pair and includes: a magnetic fastener comprising at least one magnet and a striker attracted to a magnetic field, hook and loop fastener, hook and latch fastener, button and hole fastener, snap fastener (male/female), zipper fastener (left and right sides), bolt and latch fastener, bolt and striker (hole) fastener, draw hasp and striker fastener or a combination thereof.

FIG. 3 shows a striker 390 positioned on base 301 of a magnet/striker (attracted to a magnetic field) closure pair, which is a preferred closure pair for some embodiments.

The preferred front door jambs of this invention are light in weight and preferably weigh less than five pounds. It is contemplated that embodiments of the front door jamb can weigh about 0.5 to about 5.0 pounds, including 0.5, 0.6, 0.7, 0.8, 0.9, 1.0, 1.1, 1.2, 1.3, 1.4, 1.5, 1.6, 1.7, 1.8, 1.9 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9 or 5.0 pounds.

The base 301 and spine 302 may comprise materials described above as suitable for the enclosure frame. The base and spine may comprise the same material and be integrated as a monolithic structure. In such embodiments, the base and spine can be stamped or extruded metals such as aluminum. Alternatively, the base 301 and spine 302 may comprise dissimilar materials to enhance rigidity while reducing weight or to simplify assembly. In some embodiments the base is comprised of a metal such as aluminum and the spine is comprised of a lower density material such as wood or a synthetic resin. The dissimilar materials can be joined by one or more conventional fasteners such as bolts, screws, pins, anchors, rivets, tabs or glue. In front door jamb 300, the spine 302 and base 301 are joined by screws 391 from the bottom surface 304 of the front door jamb 300.

Another preferred component provided by this invention is a rear door jamb for an open sided vehicle. A preferred rear door jamb of this invention is suited for an open sided vehicle having a roof, a vehicle door and a seat for occupants, preferably a golf cart. FIGS. 6-8 illustrate an embodiment of a preferred rear door jamb 400. In addition to providing support for a vehicle door when both are installed on such an open sided vehicle, the rear door jamb provides passive restraint of an occupant sitting in a seat of this open sided vehicle. This is accomplished through the use of a base 401 which is rigid and is of a length of about the distance from the vehicle roof to the vehicle floor.

To enhance restraint of an occupant, the base is sufficiently strong (rigid) so as to deflect less than two inches under a center load of 50 pounds over a four foot span along its length. Preferably, base 401 deflects less than one inch under a center load of 150 pounds over a four foot span along its length. Most preferably, base 401 deflects less than ½ inch under a center load of 150 pounds. It is contemplated that some embodiments of the rear door jamb of this invention can employ a rigid base which deflects from about 0.01 to about 3.0 inches, including 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 or 3.0 inches, under a center load of 50 pounds over a four foot span along its length.

Rear door jamb 400 has an inner surface 403 which faces the interior of the vehicle and an outer surface 402 which faces the exterior of the vehicle. In preferred embodiments inner surface 403 has a width greater than 1 inch and is more preferably at least two inches in width to distribute the force of any impact with an occupant. It is contemplated the inner surface 403 can have a preferred width of from about 1.7 to about ⅝ inches, including 1.8, 1.9, 2.0, 2.1, 2.2, 2.3, 2.4, 2.5, 2.6, 2.7, 2.8, 2.9, 3.0, 3.1, 3.2, 3.3, 3.4 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4 6.5, 6.6, 6.7, 6.8, 6.9, 7.0, 7.1, 7.2, 7.3, 7.4, 7.5, 7.6, 7.7, 7.8, 7.9 or 8.0 inches.

In providing rigidity, it is desirable that the rear door frame not add excessive weight to the vehicle. To this end, the base 401 of the rear door need not be as thick as it is wide. It is contemplated base 401 can have a preferred thickness of from about 0.1 to about 2.0 inches, including 0.1, 0.2, 0.3, 0.4 0.5, 0.6, 0.7, 0.8, 0.9, 1.0, 1.1, 1.2, 1.3, 1.4, 1.5, 1.6, 1.7, 1.8, 1.9, 2.0 inches.

It is preferable that the rear door jamb weigh less than ten pounds, more preferably less than 5 pounds. It is contemplated that some embodiments of the rear door jamb of this invention can weigh from about 2.0-2.5 pounds, from about 2.5-3.0 pounds, from about 3.0-3.5 pounds, from about 3.5-4.0 pounds, from about 4.0-4.5 pounds, from about 4.5-5.0 pounds, from about 5.0-5.5 pounds, from about 5.5-6.0 pounds, from about 6.0-6.5 pounds, from about 6.5-7.0 pounds, from about 7.0-7.5 pounds, from about 7.5-8.0 pounds, from about 8.5-9.0 pounds, from about 9.0-9.5 pounds, or from about 9.5-10.0 pounds.

The base 401 has an upper mount 410 at one end for mounting the rear door jamb to the roof of said vehicle either directly or indirectly through use of an adapter, at a location which enables the rear door jamb to be positioned adjacent to the seat in the open sided vehicle. Where the upper mount is indirectly connected to the roof of the vehicle through use of an adapter, the adapter preferably extends from the upper mount of the rear door jamb to an existing mount in the roof, which can be e.g., a mount for a hand hold in the roof or a roof support. Examples of suitable adapters are shown in FIGS. 16A and 16B and FIGS. 17A and 17B.

Figures 16A, 16B:
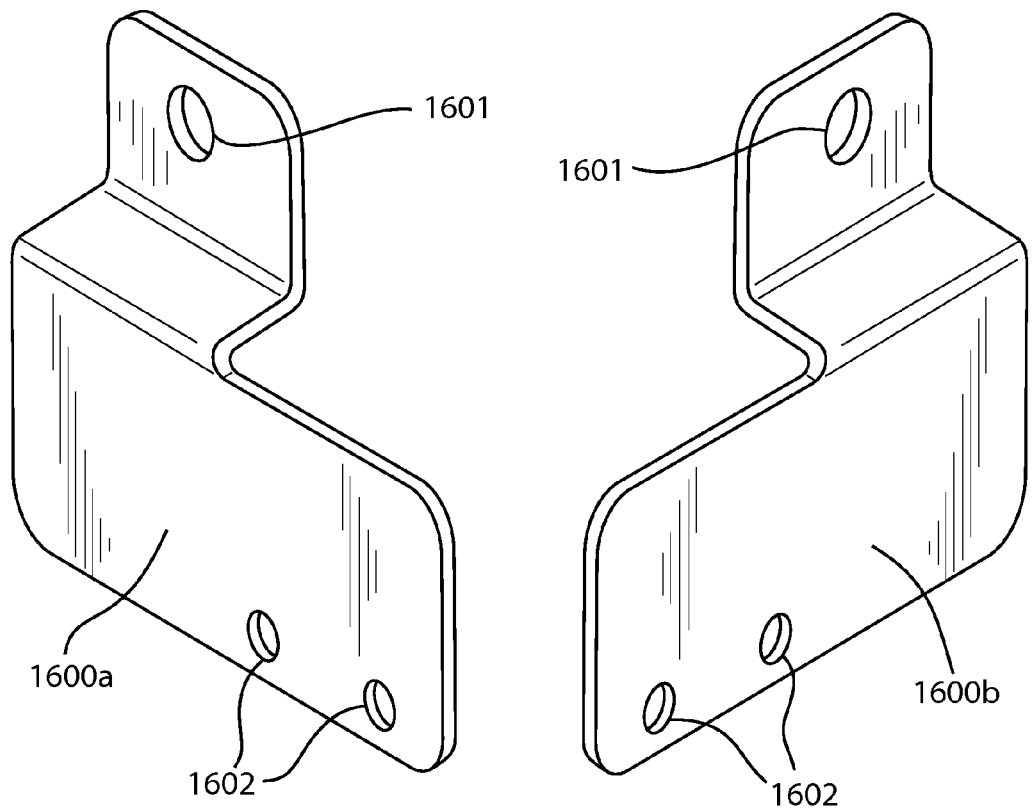
FIGS. 16A and 16B are left and right adapters for the top mounts of a rear door jamb of the present invention.

FIGS. 16A and 16B illustrate left adapter 1600a and right adapter 1600b, respectively, each having a hole 1601 for mounting to a an existing mount for a roof support and holes 1602 for mounting to the upper mount of a rear door jamb.

Figures 17A, 17B:
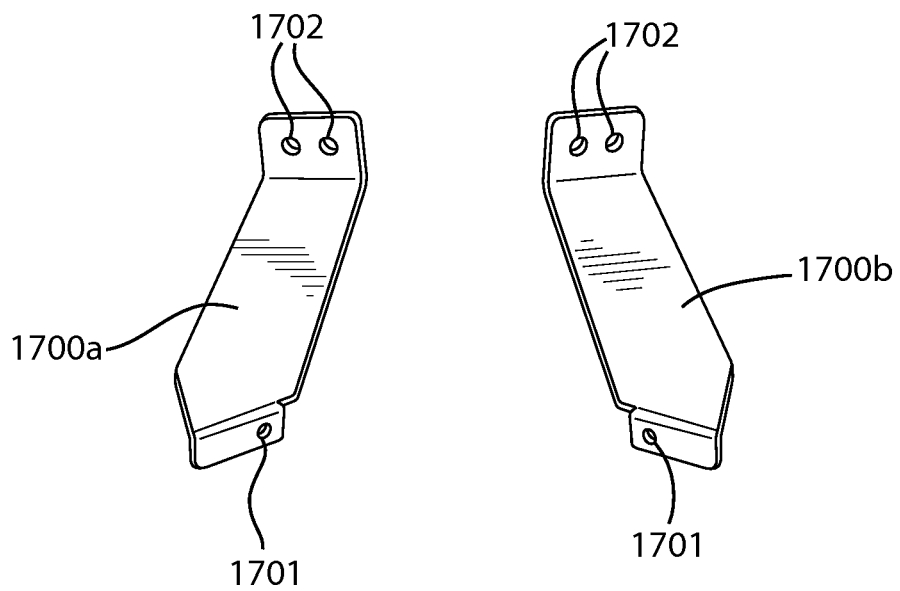
FIGS. 17A and 17B are alternative left and right adapters for the top mounts of a rear door jamb of the present invention.

FIGS. 17A and 17B illustrate alternative adapters 1700a for the left side of the vehicle and 1700b for the right side of vehicle, respectively, each having a hole 1701 for mounting to an existing mount for a roof support and holes 1702 for mounting to the upper mount of a rear door jamb.

The base 401 also has a lower mount 420 at the opposite end for mounting the rear door jamb to the floor of said vehicle either directly or indirectly through use of an adapter, at a location which enables the rear door jamb to be positioned adjacent to the seat in the open sided vehicle. Where the lower mount is indirectly connected to the floor of the vehicle through use of an adapter, the adapter preferably extends from the lower mount of the rear door jamb to a chassis frame member in the floor of the vehicle or lower sill. Examples of a suitable adapter is shown in FIG. 22.

Figure 22:
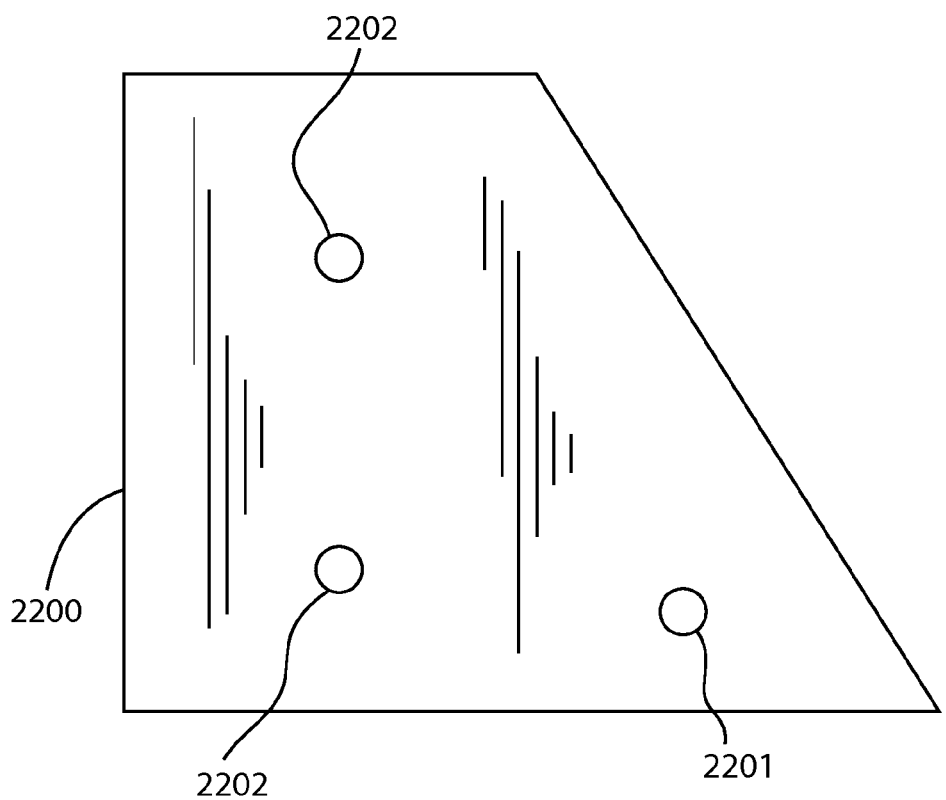
FIG. 22 is an adapter for the lower mounts of a rear door jamb of the present invention.

FIG. 22 illustrates an adapter 2200 that can be used on the right and left side of a vehicle. It comprises a hole 2201 for mounting to a chassis frame member of said vehicle and holes 2202 for mounting to the lower mount of a rear door jamb.

In some embodiments, the lower mount 420 can connect to a chassis frame member in the floor of the vehicle or proximate to the floor of the vehicle without the use of an adapter.

The upper mount and lower mounts can independently be any conventional mount including:
  a) one or more holes for receiving one or more bolts, screws, pins, rivets and tabs,
  b) one or more slots for receiving one or more bolts, screws, pins, rivets and tabs,
  c) one or more bolts to engage holes or slots,
  d) one or more screws to engage holes or slots,
  e) one or more pins to engage holes or slots,
  f) one or more anchors to engage holes and slots
  g) one or more rivets to engage holes or slots,
  h) one or more tabs to engage holes or slots,
  i) one or more welds to an adapter with one or more holes, slots, bolts, screws, anchors, pins or tabs, or
  j) a combination of a)-i).

The upper mount 410 and lower mount 420 of rear door jamb 400, shown in FIGS. 6-8, each comprise holes for receiving one or more bolts, screws, pins, rivets and tabs.

In a preferred embodiment, the rear door jamb 400 has at least three hinging mounts positioned on the base 401 to rotatably support the vehicle door when installed. These hinging mounts provide for an angle of rotation greater than 90° at said base for the vehicle door. It is contemplated that embodiments of the rear door jamb of this invention can have hinging mounts that provide an angle of rotation of greater than 180°. It is further contemplated that two hinging mounts may be sufficient to mount the door to the door jamb.

The hinging mounts of rear door jamb 400 comprise an upper hinging mount 460 positioned on the base 401 at the end near said upper mount 410, a lower hinging mount 450 positioned on the base 401 at the end near the lower mount 420 and a mid-hinging mount 470 positioned on the base 401 between the lower hinging mount 450 and the upper hinging mount 460.

In preferred embodiments of the rear door jamb, each of the upper and lower hinging mounts comprises a pin or barrel of a two component pin hinge. Lower hinging mount 450 and upper hinging mount 460 each comprise a barrel of a two component pin hinge. Plate 461 extends from base 401 with hole 462 and is the barrel of the upper hinging mount 460. Plate 451 extends from base 401 with hole 452 and is the barrel of the lower hinging mount 450.

In preferred embodiments of the rear door jamb, the mid-hinging mount is positioned on the base at about the midpoint between the upper hinging mount and the lower hinging mount. Preferably the mid-hinging mount is positioned on the base at a distance from the midpoint between the upper hinging mount and the lower hinging mount which is less than 20% of the total length of the base. Mid-hinging mount 470 is at a distance from the mid-point which is about 4% of the total length of base 401.

In preferred embodiments of the rear door jamb, the mid-hinging mount comprises a barrel of a friction hinge that dampens rotational movement of the vehicle door. Preferably, the friction hinge also restricts vertical motion of the vehicle door to restrict rattling while keeping the door mounted to the rear door jamb. In preferred embodiments, the friction hinge is removably attached to rear door jamb to simplify installation and removal of the vehicle door.

The mid-hinging mount 470 of rear door jamb 400 comprises the barrel of a friction hinge. Bracket 471 includes a barrel 472 at one end. Barrel 472 is semi-circular providing a slot 473 for the insertion of a hinge pin from the side. Bracket 471 is attached to rigid base 401 with hand screw 475. In preferred embodiments, the door can not be removed from the frame when the hand screw is installed. For these embodiments, the door be lifted off the hinge mounts only upon removal of the hand screw.

In preferred embodiments the rear door jamb 400 additionally supports fasteners for a flexible water repellant cover on outer surface 402.

In preferred embodiments, the rear door jamb provides support for a vehicle door in combination with a preferred front door jamb of this invention, such as shown in FIGS. 1 and 10.

Figure 20:
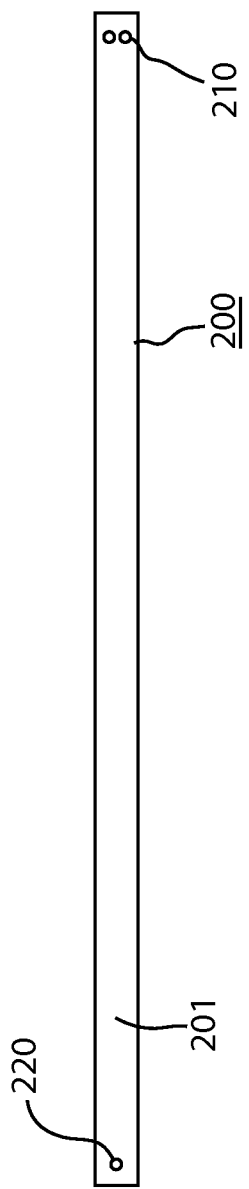
FIG. 20 is a front elevation view of a brace of the present invention.
Figure 21:
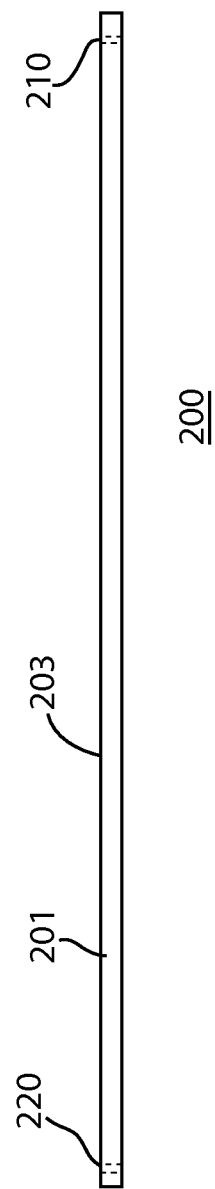
FIG. 21 is a side elevation view of a brace of FIG. 21.

In a variation of the rear door jamb of this invention there is provided a brace for an open sided vehicle with a roof and a seat for occupants which provides additional support for the roof and passive restraint of an occupant sitting in the seat for occupants. FIGS. 20 and 21 illustrate a preferred brace 200 of this invention. Brace 200 has many features of the preferred rear door jambs of this but does not require hinging mounts as it need not support a vehicle door.

Brace 200 comprises a base 201 of a length which extends approximately the distance from the vehicle roof to the vehicle floor and a width of at least two inches. The base, like the rear door jamb, is sufficiently rigid so as to deflect less than two inches under a center load of 50 pounds over a four foot span along its length. Most preferably, base 201 deflects less than ½ inch under a center load of 150 pounds. It is contemplated that in some embodiments of this invention, the brace of this invention can employ a base which deflects from about 0.01 to about 3.0 inches, including 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 or 3.0 inches, under a center load of 50 pounds over a four foot span along its length.

Brace 200 has an inner surface 203 which faces the interior of the vehicle and an outer surface 202 which faces the exterior of the vehicle. In preferred embodiments inner surface 203 has a width greater than 1 inch and is more preferably at least two inches in width to increase the surface area and distribute the force of any impact with an occupant. It is contemplated the inner surface 203 can have a preferred width of from about 1.7 to about 8.0 inches, including, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4 6.5, 6.6, 6.7, 6.8, 6.9, 7.0, 7.1, 7.2, 7.3, 7.4, 7.5, 7.6, 7.7, 7.8, 7.9 or 8.0 inches.

In providing rigidity, it is desirable that the brace not add excessive weight to the vehicle. To this end, the base 201 of the brace need not be as thick as it is wide. It is contemplated base 201 can have a preferred thickness of about 0.1, 0.2, 0.3, 0.4 0.5, 0.6, 0.7, 0.8, 0.9, 1.0, 1.1, 1.2, 1.3, 1.4, 1.5, 1.6, 1.7, 1.8, 1.9, 2.0 inches.

It is preferable that the brace weigh less than ten pounds, more preferably less than 5 pounds. It is contemplated that some embodiments of the brace of this invention can weigh from about 2.0-2.5 pounds, from about 2.5-3.0 pounds, from about 3.0-3.5 pounds, from about 3.5-4.0 pounds, from about 4.0-4.5 pounds, from about 4.5-5.0 pounds, from about 5.0-5.5 pounds, from about 5.5-6.0 pounds, from about 6.0-6.5 pounds, from about 6.5-7.0 pounds, from about 7.0-7.5 pounds, from about 7.5-8.0 pounds, from about 8.5-9.0 pounds, from about 9.0-9.5 pounds, or from about 9.5-10.0 pounds.

Analogous to preferred rear door jambs, the base 201 has an upper mount 210 at one end for mounting the brace to the roof of said vehicle either directly or indirectly through use of an adapter, at a location which enables the brace to be positioned adjacent to the seat in the open sided vehicle. Where the upper mount is indirectly connected to the roof of the vehicle through use of an adapter, the adapter preferably extends from the upper mount of the brace to an existing mount in the roof, which can be a mount for a hand hold in the roof or a roof support. Examples of suitable adapters are shown in FIGS. 16A and 16B and FIGS. 17A and 17B.

The base 201 also has a lower mount 220 at the opposite end for mounting the brace to the floor of said vehicle either directly or indirectly through use of an adapter, at a location which enables the brace to be positioned adjacent to the seat in the open sided vehicle. Where the lower mount is indirectly connected to the floor of the vehicle through use of an adapter, the adapter preferably extends from the lower mount of the brace to a chassis frame member in the floor of the vehicle or the lower sill of the vehicle. An example of a suitable adapter is shown in FIG. 22. In some embodiments, the lower mount can connect to a chassis frame member in the floor of the vehicle without the use of an adapter.

The upper mount and lower mounts can, independently, be any conventional mount including:
  a) one or more holes for receiving one or more bolts, screws, pins, rivets and tabs,
  b) one or more slots for receiving one or more bolts, screws, pins, rivets and tabs,
  c) one or more bolts to engage holes or slots,
  d) one or more screws to engage holes or slots,
  e) one or more pins to engage holes or slots,
  f) one or more anchors to engage holes and slots
  g) one or more rivets to engage holes or slots,
  h) one or more tabs to engage holes or slots,
  i) one or more welds to an adapter with one or more holes, slots, bolts, screws, anchors, pins or tabs, or
  j) a combination of a)-i).

The upper mount 210 and lower mount 220 of brace 200 each comprise holes for receiving one or more bolts, screws, pins, rivets and tabs.

Another preferred component provided by this invention is a door frame for an open sided vehicle, preferably a golf cart. This door frame can be supported by a preferred rear door jamb of this invention, such as shown in FIGS. 6-8, and a preferred front door jamb of this invention such as shown in FIGS. 3-4.

Figure 9:
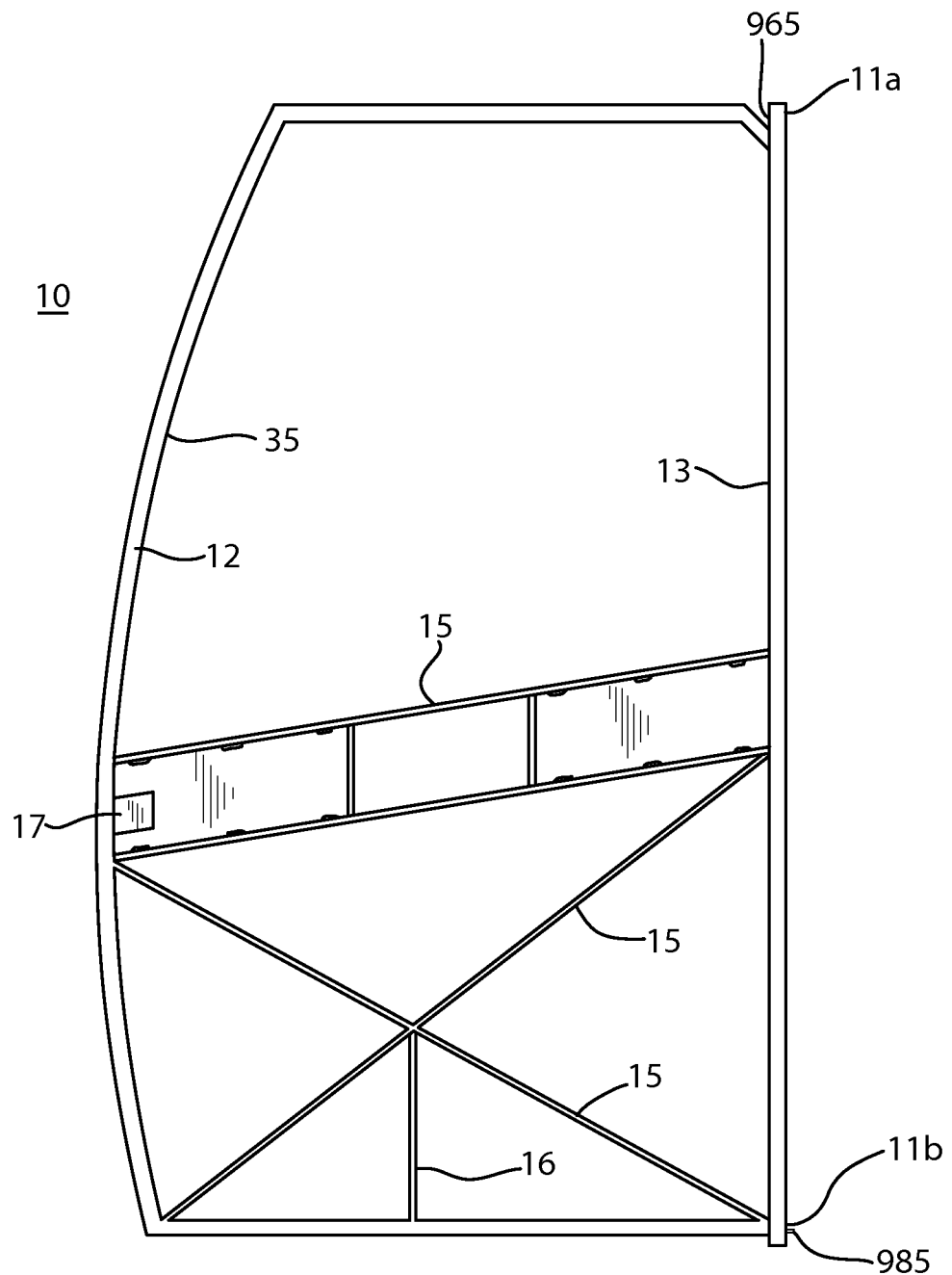
FIG. 9 is a front elevation of a door frame of the present invention.

FIGS. 9 and 10 illustrate preferred door frame 10. Door frame 10 comprises a frame 35 which defines its periphery and is adapted to support flexible water repellant cover 21. The front edge 12 of frame 35 is convexly curved to be supported by a preferred front door jamb of this invention, once installed. The rear edge 13 of the frame 35 is substantially straight and preferably has three hinging mounts which interact with the three hinging mounts of a preferred rear door jamb of this invention for support. Upper hinging mount 11a and lower hinging mount 11b are pins 965 and 985 that are adapted to be inserted in barrel of a pin hinge such as a hole in plate or adapter. In a preferred embodiment, rear edge 13 of frame 35 is the hinge pin for a hinging mount of the rear door jamb.

In a preferred embodiment, the door frame weighs less than 5 pounds. In another preferred embodiment, the door frame has optional cross members and support members. Door frame 10 has cross members 15, each of which extend from the front edge 12 to the rear edge 13, and support member 16, which extends from the frame 35 to the cross members 15. Preferred embodiments of the door frame 10 also include one component of a two component closure pair. Door frame 10 includes a magnet 17 positioned on the front edge 12 of the frame 35. Preferably the magnet is positioned to correspond to a striker 390 mounted on the front door jamb shown in FIGS. 3-5.

Other suitable components from two component closure pairs are: a hook and loop fastener, a hook and latch fastener, button and hole fastener, a snap fastener (male/female), a zipper fastener (left and right sides), a bolt and latch fastener, a bolt and striker (hole) fastener, a draw hasp and striker fastener or a combination thereof. It is contemplated other conventional closure pairs are suitable.

In a preferred embodiment, the closure pair provides sufficient closing strength once engaged such that the door frame will provide passive restraint of an occupant sitting in a seat of the vehicle.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and U.S. Provisional Application 61/607,709, filed on Mar. 7, 2012, and U.S. Provisional Application No. 61/772,727, filed Mar. 6, 2013, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A front door jamb of an enclosure for an open sided vehicle having a roof, a floor, a windshield frame, at least one front fender and a vehicle door, wherein said front door jamb provides support for said vehicle door when in a closed position,
  wherein said front door jamb comprises:
    a) a base having a convexly curved shape which conforms to a convexly curved shape of a front edge of said vehicle door having a top surface adapted to support the front edge of said vehicle door when in a closed position, b) a spine having a convexly curved shape which conforms to a convexly curved shape of the front edge of said vehicle door positioned on the top surface of said base so as to cover only a portion of the top surface of said base and abut the front edge of said vehicle door when said vehicle door is in a closed position, and wherein said spine extends above the top surface of the base to a height greater than 50% of the thickness of said vehicle door, c) an upper mount on said base for removably mounting the front door jamb to the roof of said open sided vehicle either directly or indirectly through use of an adapter, d) a lower mount on said base for removably mounting the front door jamb to the floor of said open sided vehicle either directly or indirectly through use of an adapter, and e) an intermediate mount on the base for removably mounting the front door jamb to a front fender or windshield frame of said open sided vehicle, either directly or indirectly through use of an adapter.

2. A front door jamb of claim 1 wherein the spine extends above the top surface of the base to a height equal to or greater than 100% of the thickness of the vehicle door.

3. A front door jamb of claim 1 wherein the base and spine are convexly curved to provide a wider space for entering the vehicle at the lower half of the front door jamb than the upper half of the front door jamb.

4. The front door jamb of claim 3 wherein the spine extends above the top surface of the base to a height of from 100% to 250% of the thickness of the vehicle door.

5. The front door jamb of claim 4 wherein the spine extends above the top surface of the base to a height sufficient to impede air from coming between the top surface of the base and the front edge of the vehicle door when the vehicle door is in a closed position and the vehicle is in forward motion.

6. A front door jamb of claim 1 wherein the base and spine are curved to conform to the shape of the front fender of the vehicle.

7. A front door jamb of claim 1 wherein the top surface of the base supports fasteners mounted on a flange to mount a cover to the base.

8. A front door jamb of claim 1 wherein the vehicle is a golf cart.

9. A front door jamb of claim 1 wherein the upper mount is configured to indirectly connect to the roof of said open sided vehicle at an existing mount for a roof support of said open sided vehicle through use of an adapter, wherein said adapter extends from the upper mount of the front door jamb to said existing mount for a roof support.

10. The front door jamb of claim 1 wherein the intermediate mount is configured to indirectly connect to the fender, dash board trim, console, or windshield frame of said open sided vehicle at an existing mount through use of an adapter, wherein said adapter extends from the intermediate mount of the front door jamb to said existing mount.

11. The front door jamb of claim 1 wherein the lower mount is adapted to indirectly connect to the floor or lower sill portion of said open sided vehicle at an existing mount through use of an adapter, wherein said adapter extends from the lower mount of the front door jamb to said existing mount.

12. The front door jamb of claim 1 wherein the lower mount is adapted to directly connect to the floor or lower sill portion of said open sided vehicle at a chassis frame member of said open sided vehicle without the use of an adapter.

13. A front door jamb of claim 1 further comprising a magnetic fastener comprising a magnet or a striker attracted to a magnetic field to retain a door in a closed position.

14. A rear door jamb of an enclosure for an open sided vehicle having a roof, a vehicle door and a seat for occupants, wherein said rear door jamb provides support for said vehicle door when said rear door jamb and vehicle door are installed on said open sided vehicle, wherein said rear door jamb comprises:

a) a base of a length which extends approximately the distance from the vehicle roof to the vehicle floor, wherein said base deflects less than two inches under a center load of 50 pounds over a four foot span along its length, b) an upper mount at one end of said base for mounting the rear door jamb to the roof or roof support of said vehicle either directly or indirectly through use of an adapter, at a location which enables the rear door jamb to be positioned adjacent to the seat in said open sided vehicle, c) a lower mount at the end of said base opposite the upper mount, for mounting the rear door jamb to a bottom portion of said vehicle either directly or indirectly through use of an adapter, at a location which enables the rear door jamb to be positioned adjacent to a seat in said open sided vehicle, d) at least two hinging mounts positioned on said base adapted to rotatably support a vehicle door when installed, said hinging mounts comprising
i) an upper hinging mount positioned on the base at the end near said upper mount,
ii) a lower hinging mount positioned on the base at the end near the lower mount.

15. A rear door jamb as in claim 14 wherein each of the upper and lower hinging mounts comprises a pin or barrel of a two component pin hinge.

16. A rear door jamb as in claim 14 wherein said hinging mounts further comprise a mid-hinging mount positioned on the base between the lower hinging mount and the upper hinging mount and the mid-hinging mount comprises a barrel that restricts vertical movement of the vehicle door.

17. A rear door jamb as in claim 16 wherein the mid-hinging mount is positioned on the base at a distance from the midpoint between the upper hinging mount and lower hinging mount which is less than 20% of the total length of the base.

18. A rear door jamb as in claim 17 wherein the mid-hinging mount is removably attached to said base with a hand screw.

19. A rear door jamb of claim 14 wherein the base additionally includes fasteners for a flexible water repellant cover.

20. A rear door jamb of claim 14 wherein said vehicle is a golf cart.

21. A rear door jamb of claim 14 wherein the upper mount is adapted to indirectly connect to a mount for a hand hold in the roof of said vehicle or a mount for a roof support through the use of an adapter, wherein said adapter extends from the upper mount of the rear door jamb to a mount for a hand hold in the roof or a mount for a roof support.

22. A rear door jamb of claim 14 wherein the lower mount is adapted to indirectly connect to a lower portion of said vehicle at a chassis frame member through use of an adapter, wherein said adapter extends from the lower mount of the rear door jamb to said chassis frame member.

23. A rear door jamb of claim 14 wherein the lower mount is adapted to directly connect to at a chassis frame member of said vehicle without the use of an adapter.

24. A rear door jamb of claim 14 wherein the base is substantially rectangular and is sufficiently rigid so as to deflect less than one inch under a center load of 150 pounds over a four foot span along its length.

25. A rear door jamb of an enclosure for an open sided vehicle having a roof, a vehicle door, a seat for occupants, a windshield frame and at least one front fender,
wherein said rear door jamb provides support for said vehicle door in combination with a front door jamb of claim 1 when said rear door jamb, front door jamb and vehicle door are installed on said open sided vehicle and also provides passive restraint of an occupant sitting in said seat for occupants,
wherein said rear door jamb
extends approximately the distance from the vehicle roof to the vehicle floor and being sufficiently rigid so as to deflect less than two inches under a center load of 50 pounds over a four foot span along its length, said rear door jamb comprising
a) an upper mount at one end for mounting to the roof of said vehicle either directly or indirectly through use of an adapter, at a location which enables the rear door jamb to be positioned adjacent to a seat in said open sided vehicle,
b) a lower mount at the end opposite the upper mount, for mounting to the floor of said vehicle either directly or indirectly through use of an adapter, at a location which enables the rear door jamb to be positioned adjacent to a seat in said open sided vehicle,
c) a plurality of hinging mounts positioned to rotatably support a vehicle door when installed with an angle of rotation greater than 90° measured from said rear door jamb,
wherein said front door jamb has a convexly curved shape which defines an opening to the vehicle wider at a lower half of the opening than an upper half of the opening so as to provide more space for entering the vehicle at the lower half of the opening than the upper half of the opening.

26. A door frame as in claim 25 wherein the rear edge of the frame is the hinge pin for the mid-hinging mount of the rear door jamb.

27. A door frame as in claim 25 which additionally comprises cross members from the front edge to the rear edge of the outer frame and one component of a two component closure pair positioned on the front edge of the outer frame that corresponds to a closure pair component on the front door jamb
wherein said door frame is sufficiently rigid to provide passive restraint of an occupant sitting in a seat in an open sided vehicle once installed and the closure pair of the door and front door jamb is engaged.

28. A rear door jamb of claim 25 wherein the a plurality of hinging mounts comprise
i) an upper hinging mount positioned on the rear door jamb at the end near said upper mount,
ii) a lower hinging mount positioned on the rear door jamb at the end near the lower mount and
iii) a mid-hinging mount positioned on the rear door jamb between the lower hinging mount and the upper hinging mount.

29. An enclosure for an open sided vehicle having a roof, roof supports and an occupant compartment, the enclosure providing a cover extending from front roof supports to enclose the occupant compartment, the enclosure comprising:
a frame assembly comprising a front door jamb having a convexly curved shape which defines an opening to the vehicle wider at a lower half of the opening than an upper half of the opening so as to provide more space for entering the vehicle at the lower half of the opening than the upper half of the opening and a substantially vertical rear door jamb positioned adjacent to an occupant seating area, the front and rear door jambs defining an opening to receive a door, the front and rear door jambs being mounted on both the driver and occupant sides of the vehicle,
a door hingedly mounted to a rear door jamb, the door being movable between an open and closed position to allow ingress and egress to the occupant compartment, the door including a frame covered with a flexible material,
a flexible, front cover section extending from each of the front roof supports to a forward edge of the front jambs, and
a flexible, rear cover section extending from a rearward edge of one of the rear door jambs around the back of the vehicle to a rearward edge of the rear door jamb on the opposite side of the vehicle.

30. The enclosure of claim 29 wherein the front door jamb includes an upper mount for removably mounting the front door jamb to an existing roof support, a lower mount for removably mounting the front door jamb to a lower portion of said open sided vehicle, and an intermediate mount for removably mounting the front door jamb to a front fender portion, a center console portion or windshield support frame of the open sided vehicle.

31. The enclosure of claim 29 wherein the rear door jamb is sufficiently rigid so as to deflect less than two inches under a center load of 50 lbs. over a four foot span along its length.

32. The enclosure of claim 31 wherein the rear cover section includes a plurality of pockets for removably receiving support bars and frames to define a substantially u-shaped rear cover section.

33. The enclosure of claim 29 wherein the a pair of support bars and frames define corners for the rear section.

* * * * *

UNITED STATES PATENT AND TRADEMARK OFFICE
CERTIFICATE OF CORRECTION

PATENT NO.       : 8,882,170 B2
APPLICATION NO.  : 13/788888
DATED            : November 11, 2014
INVENTOR(S)      : Arlen F. Brown, Jr.

It is certified that error appears in the above-identified patent and that said Letters Patent is hereby corrected as shown below:

IN THE CLAIMS

Column 16, lines 31 and 32 (Claim 15), delete "of a two component pin hinge".

Column 17, line 2 (Claim 25), reads: -- vehicle having a roof, a vehicle door, a seat for occupants, a --.
Should read: -- vehicle having a roof, a floor, a vehicle door, a seat for occupants, a --.

Column 17, lines 5 and 6 (Claim 25), delete "of claim 1".

Signed and Sealed this
Fourteenth Day of April, 2015

Michelle K. Lee
*Director of the United States Patent and Trademark Office*